(12) United States Patent
Wright et al.

(10) Patent No.: US 8,088,197 B2
(45) Date of Patent: Jan. 3, 2012

(54) REMOVAL OF CARBON DIOXIDE FROM AIR

(75) Inventors: Allen B. Wright, Tucson, AZ (US);
Klaus S. Lackner, Tucson, AZ (US);
Burton Wright, Tucson, AZ (US); Matt Wallen, Tucson, AZ (US); Ursula Ginster, Tucson, AZ (US); Eddy J. Peters, Surrey (CA)

(73) Assignee: Kilimanjaro Energy, Inc., Waukesha, WI (US)

( * ) Notice: Subject to any disclaimer, the term of this patent is extended or adjusted under 35 U.S.C. 154(b) by 801 days.

(21) Appl. No.: 11/996,615

(22) PCT Filed: Jul. 28, 2006

(86) PCT No.: PCT/US2006/029238
§ 371 (c)(1),
(2), (4) Date: Jan. 24, 2008

(87) PCT Pub. No.: WO2007/016271
PCT Pub. Date: Feb. 8, 2007

(65) Prior Publication Data
US 2009/0294366 A1    Dec. 3, 2009

(51) Int. Cl.
*B01D 53/02* (2006.01)
*B01D 53/22* (2006.01)

(52) U.S. Cl. ......... 95/51; 95/96; 95/139; 96/11; 96/108; 96/121; 96/134

(58) Field of Classification Search ............ 95/45, 51, 95/96, 139; 45/96, 139; 96/4, 11, 108, 121, 96/134–135, 154
See application file for complete search history.

(56) References Cited

U.S. PATENT DOCUMENTS

| | | | |
|---|---|---|---|
| 1,031,799 A | 7/1912 | MacKay | |
| 1,296,889 A * | 3/1919 | White | 100/187 |
| 1,482,367 A | 1/1924 | Elledge | |
| 2,718,454 A * | 9/1955 | Wylie | 423/229 |
| 2,796,145 A | 6/1957 | King | 96/262 |
| 3,024,207 A * | 3/1962 | Shaw et al. | 521/28 |
| 3,063,195 A | 11/1962 | Ravich | 47/17 |
| 3,318,588 A | 5/1967 | Russell et al. | 261/153 |
| 3,330,750 A * | 7/1967 | McRae et al. | 204/524 |
| 3,344,050 A * | 9/1967 | Mayland et al. | 205/555 |
| 3,466,138 A | 9/1969 | Spiegler et al. | 23/2 |
| 3,489,506 A | 1/1970 | Galstaun et al. | 423/233 |

(Continued)

FOREIGN PATENT DOCUMENTS
CA    1 212 522    10/1986
(Continued)

OTHER PUBLICATIONS

Office Action+Translation issued by the Chinese Patent Office dated Jan. 20, 2011, Appln. No. 200680030297.X (12 pgs).

(Continued)

*Primary Examiner* — Duane Smith
(74) *Attorney, Agent, or Firm* — Hayes Soloway P.C.

(57) ABSTRACT

The present invention is directed to methods for removing $CO_2$ from air, which comprises exposing sorbent covered surfaces to the air. The invention also provides for an apparatus for exposing air to a $CO_2$ sorbent. In another aspect, the invention provides a method and apparatus for separating carbon dioxide ($CO_2$) bound in a sorbent.

25 Claims, 15 Drawing Sheets

U.S. PATENT DOCUMENTS

| | | | |
|---|---|---|---|
| 3,498,026 A | 3/1970 | Messinger et al. ............... 55/73 |
| 3,554,691 A | 1/1971 | Kuo et al. |
| 3,594,989 A | 7/1971 | Bastiaans ....................... 55/142 |
| 3,627,478 A | 12/1971 | Tepper ........................ 423/230 |
| 3,627,703 A | 12/1971 | Kojima ......................... 260/2.1 |
| 3,645,072 A | 2/1972 | Clapham ....................... 55/387 |
| 3,691,109 A | 9/1972 | Larsen ...................... 260/2.1 R |
| 3,710,778 A | 1/1973 | Cornelius ........................ 128/2 |
| 3,712,025 A * | 1/1973 | Wallace ........................... 95/68 |
| 3,727,375 A * | 4/1973 | Wallace ........................... 95/68 |
| 3,833,710 A | 9/1974 | Deschamps et al. .......... 423/573 |
| 3,865,924 A | 2/1975 | Gidaspow et al. ............ 423/230 |
| 3,876,565 A | 4/1975 | Takashima et al. ........... 260/2.1 |
| 3,876,738 A | 4/1975 | Marinaccio et al. ............ 264/41 |
| 3,907,967 A | 9/1975 | Filss ............................. 423/210 |
| 3,915,822 A | 10/1975 | Veltman ....................... 204/151 |
| 3,948,627 A | 4/1976 | Schwarz et al. ................ 55/230 |
| 3,981,698 A | 9/1976 | Leppard .......................... 55/31 |
| 4,012,206 A | 3/1977 | Macriss et al. .................. 55/34 |
| 4,047,894 A | 9/1977 | Kuhl .............................. 23/284 |
| 4,167,551 A | 9/1979 | Tamura et al. ................ 521/27 |
| 4,197,421 A | 4/1980 | Steinberg ..................... 585/733 |
| 4,238,305 A | 12/1980 | Gancy et al. ................. 204/180 |
| 4,239,515 A | 12/1980 | Yanagioka et al. ............. 55/223 |
| 4,246,241 A | 1/1981 | Mathur et al. ................ 423/179 |
| 4,296,050 A | 10/1981 | Meier ....................... 261/112.2 |
| 4,340,480 A | 7/1982 | Pall et al. ...................... 210/490 |
| 4,436,707 A | 3/1984 | Karwat ......................... 423/226 |
| 4,475,448 A | 10/1984 | Shoaf et al. .................. 99/323.1 |
| 4,497,641 A | 2/1985 | Brown, Jr. et al. .............. 55/240 |
| 4,511,375 A | 4/1985 | BeVier ............................ 55/28 |
| 4,528,248 A | 7/1985 | Galbraith ........................ 429/8 |
| 4,566,221 A | 1/1986 | Kossin ......................... 47/41.12 |
| 4,592,817 A | 6/1986 | Chlanda et al. ............... 204/534 |
| 4,594,081 A | 6/1986 | Kroll et al. ..................... 96/235 |
| 4,608,140 A | 8/1986 | Goldstein .................. 435/173.9 |
| 4,678,648 A | 7/1987 | Wynn ........................... 423/228 |
| 4,711,645 A | 12/1987 | Kumar ............................ 55/26 |
| 4,729,883 A | 3/1988 | Lam et al. .................... 423/228 |
| 4,770,777 A | 9/1988 | Steadly et al. ................ 210/490 |
| 4,804,522 A | 2/1989 | Hass ............................. 423/235 |
| 4,810,266 A | 3/1989 | Zinnen et al. .................... 55/68 |
| 4,861,360 A | 8/1989 | Apffel ............................. 62/17 |
| 4,869,894 A | 9/1989 | Wang et al. .................. 423/650 |
| 4,899,544 A | 2/1990 | Boyd ............................. 60/618 |
| 4,906,263 A | 3/1990 | Von Blucher et al. .......... 96/135 |
| 4,941,898 A | 7/1990 | Kimura ......................... 96/282 |
| 5,070,664 A | 12/1991 | Groh et al. .................... 52/177 |
| 5,180,750 A * | 1/1993 | Sugaya et al. ................. 521/32 |
| 5,215,662 A | 6/1993 | Johnson et al. .......... 210/500.38 |
| 5,277,915 A | 1/1994 | Provonchee et al. ......... 424/485 |
| 5,281,254 A | 1/1994 | Birbara et al. ................... 95/44 |
| 5,308,466 A | 5/1994 | Ganzi et al. .................. 204/151 |
| 5,316,637 A | 5/1994 | Ganzi et al. ................ 204/182.4 |
| 5,318,758 A | 6/1994 | Fujii et al. .................... 423/228 |
| 5,344,627 A | 9/1994 | Fujii et al. .................... 423/220 |
| 5,385,610 A | 1/1995 | Deerer et al. ................. 118/241 |
| 5,389,257 A | 2/1995 | Todd et al. .................... 210/602 |
| 5,414,957 A | 5/1995 | Kenney ...................... 47/41.12 |
| 5,454,189 A | 10/1995 | Graham et al. .............. 47/41.12 |
| 5,525,237 A | 6/1996 | Birbara et al. ................ 210/670 |
| 5,535,989 A | 7/1996 | Sen ............................ 261/112.1 |
| 5,658,372 A | 8/1997 | Gadkaree ........................ 95/116 |
| 5,682,709 A | 11/1997 | Erickson .................... 47/58.1 R |
| 5,711,770 A | 1/1998 | Malina ...................... 48/197 R |
| 5,756,207 A | 5/1998 | Clough et al. ................ 428/375 |
| 5,779,767 A | 7/1998 | Golden et al. ................... 95/96 |
| 5,788,826 A | 8/1998 | Nyberg ......................... 204/536 |
| 5,797,979 A * | 8/1998 | Quinn ............................. 95/97 |
| 5,876,488 A | 3/1999 | Birbara et al. .................. 95/139 |
| 5,887,547 A | 3/1999 | Caveny et al. ............... 119/174 |
| 5,914,455 A | 6/1999 | Jain et al. ......................... 95/96 |
| 5,917,136 A | 6/1999 | Gaffney et al. .................. 95/98 |
| 5,934,379 A | 8/1999 | Ostlyngen et al. ............. 169/46 |
| 5,955,043 A | 9/1999 | Neuman et al. ............ 423/206.2 |
| 5,972,080 A | 10/1999 | Nagata ............................ 96/13 |
| 5,980,611 A | 11/1999 | Kumar et al. .................. 95/101 |
| 6,004,381 A | 12/1999 | Rohrbach et al. ............... 95/211 |
| 6,027,552 A | 2/2000 | Ruck et al. |
| 6,083,740 A | 7/2000 | Kodo et al. ................... 435/266 |
| 6,117,404 A | 9/2000 | Mimura et al. ............... 423/228 |
| 6,136,075 A | 10/2000 | Bragg et al. .................... 96/135 |
| 6,180,012 B1 | 1/2001 | Rongved ...................... 210/717 |
| 6,221,225 B1 | 4/2001 | Mani ............................ 204/523 |
| 6,228,145 B1 | 5/2001 | Falk-Pedersen et al. ......... 95/44 |
| 6,237,284 B1 | 5/2001 | Erickson .................... 47/58.1 R |
| 6,279,576 B1 * | 8/2001 | Lambert .................. 128/205.28 |
| 6,306,803 B1 | 10/2001 | Tazaki .......................... 508/539 |
| 6,316,668 B1 | 11/2001 | King et al. .................... 562/580 |
| 6,334,886 B1 | 1/2002 | Barnes, Jr. et al. ............. 95/181 |
| 6,364,938 B1 | 4/2002 | Birbara et al. .................. 95/139 |
| 6,402,819 B1 | 6/2002 | De Ruiter et al. ............... 96/153 |
| 6,503,957 B1 | 1/2003 | Bernatowicz et al. .......... 521/27 |
| 6,547,854 B1 | 4/2003 | Gray et al. ...................... 95/139 |
| 6,582,498 B1 | 6/2003 | Sass et al. ....................... 95/211 |
| 6,617,014 B1 | 9/2003 | Thomson .................. 428/304.4 |
| 6,632,848 B2 | 10/2003 | Sugaya |
| 6,645,272 B2 | 11/2003 | Lemaire et al. ................. 95/174 |
| 6,716,888 B2 | 4/2004 | Bernatowicz et al. .......... 521/27 |
| 6,755,892 B2 | 6/2004 | Nalette et al. .................. 95/139 |
| 6,863,713 B1 | 3/2005 | Ghosal et al. ................... 95/117 |
| 6,890,497 B2 | 5/2005 | Rau et al. ...................... 423/220 |
| 6,908,497 B1 | 6/2005 | Sirwardane ..................... 95/136 |
| 6,969,466 B1 | 11/2005 | Starner ......................... 210/663 |
| 7,067,456 B2 | 6/2006 | Fan et al. ...................... 502/400 |
| 7,132,090 B2 | 11/2006 | Dziedzic et al. .............. 423/230 |
| 7,270,796 B2 | 9/2007 | Kemp et al. .................. 423/549 |
| 7,343,341 B2 | 3/2008 | Sandor et al. ................... 705/37 |
| 7,364,608 B2 * | 4/2008 | Tanahashi et al. ............... 96/108 |
| 7,384,621 B2 | 6/2008 | Stevens et al. ................ 423/650 |
| 7,415,418 B2 | 8/2008 | Zimmerman ..................... 705/1 |
| 7,420,004 B2 | 9/2008 | Hardy et al. .................. 518/704 |
| 7,655,069 B2 | 2/2010 | Wright et al. .................... 95/92 |
| 7,708,806 B2 | 5/2010 | Wright et al. .................. 95/139 |
| 7,776,296 B2 | 8/2010 | Sarlis ............................ 423/229 |
| 7,993,432 B2 | 8/2011 | Wright et al. .................. 95/139 |
| 2001/0004895 A1 | 6/2001 | Preiss .................... 128/205.28 |
| 2001/0009124 A1 | 7/2001 | Suzuki et al. ................... 95/113 |
| 2001/0022952 A1 | 9/2001 | Rau et al. ...................... 422/169 |
| 2002/0083833 A1 | 7/2002 | Nalette et al. ................... 95/139 |
| 2002/0102674 A1 | 8/2002 | Anderson ..................... 435/174 |
| 2002/0178925 A1 | 12/2002 | Mimura et al. ................. 96/299 |
| 2003/0022948 A1 | 1/2003 | Seiki et al. .................... 518/704 |
| 2003/0145726 A1 | 8/2003 | Gueret et al. .................... 95/96 |
| 2003/0167692 A1 | 9/2003 | Jewell et al. ................... 48/197 |
| 2003/0205692 A1 | 11/2003 | Fleming et al. ................. 252/70 |
| 2003/0220188 A1 | 11/2003 | Marand et al. ................ 502/60 |
| 2004/0031424 A1 | 2/2004 | Pope ............................ 110/230 |
| 2004/0069144 A1 | 4/2004 | Wegeng et al. ................ 95/106 |
| 2004/0103831 A1 | 6/2004 | Pope ............................ 110/341 |
| 2004/0134353 A1 | 7/2004 | Gillingham et al. ............. 95/273 |
| 2004/0195115 A1 | 10/2004 | Colombo ..................... 206/204 |
| 2004/0213705 A1 | 10/2004 | Blencoe et al. ............... 422/129 |
| 2004/0219090 A1 | 11/2004 | Dziedzic et al. ............ 423/437.1 |
| 2005/0011770 A1 | 1/2005 | Katsuyoshi et al. ........... 205/742 |
| 2005/0063956 A1 | 3/2005 | Bernklau et al. ............. 424/93.4 |
| 2005/0092176 A1 | 5/2005 | Ding et al. ....................... 95/90 |
| 2005/0095486 A1 | 5/2005 | Hamamoto et al. ............. 429/33 |
| 2005/0204915 A1 | 9/2005 | Sammons et al. ............... 95/45 |
| 2005/0252215 A1 | 11/2005 | Beaumont ...................... 60/753 |
| 2005/0269094 A1 | 12/2005 | Harris .......................... 166/302 |
| 2005/0279095 A1 | 12/2005 | Goldman .................... 60/641.8 |
| 2006/0013963 A1 | 1/2006 | Thomson ..................... 427/487 |
| 2006/0042209 A1 | 3/2006 | Dallas et al. .................... 55/524 |
| 2006/0051274 A1 | 3/2006 | Wright et al. ................. 423/220 |
| 2006/0186562 A1 | 8/2006 | Wright et al. ................... 261/94 |
| 2006/0249020 A1 | 11/2006 | Tonkovich et al. .............. 95/115 |
| 2006/0289003 A1 | 12/2006 | Lackner et al. .......... 128/200.24 |
| 2007/0004023 A1 | 1/2007 | Trachtenberg ................ 435/266 |
| 2007/0089605 A1 | 4/2007 | Lampinen ...................... 95/139 |
| 2007/0149398 A1 | 6/2007 | Jones et al. ................... 502/402 |
| 2007/0187247 A1 | 8/2007 | Lackner et al. ............... 204/518 |
| 2007/0199448 A1 | 8/2007 | Yates et al. ..................... 95/139 |
| 2007/0217982 A1 | 9/2007 | Wright et al. ................. 423/230 |
| 2008/0008793 A1 | 1/2008 | Forsyth et al. ................ 426/118 |
| 2008/0025893 A1 * | 1/2008 | Asprion et al. ............... 423/228 |
| 2008/0031801 A1 | 2/2008 | Lackner et al. ............... 423/438 |

| | | |
|---|---|---|
| 2008/0087165 A1 | 4/2008 | Wright et al. ............... 95/51 |
| 2008/0293976 A1 | 11/2008 | Olah et al. ............... 95/139 |
| 2009/0120288 A1 | 5/2009 | Lackner et al. ............... 95/68 |
| 2009/0232861 A1 | 9/2009 | Wright et al. ............... 424/405 |
| 2009/0294366 A1 | 12/2009 | Wright et al. ............... 210/683 |
| 2010/0105126 A1 | 4/2010 | Wright et al. ............... 435/257.1 |
| 2010/0319537 A1 | 12/2010 | Eisenberger et al. ........... 95/139 |

FOREIGN PATENT DOCUMENTS

| | | |
|---|---|---|
| CA | 1 236 877 | 5/1988 |
| DE | 4 130 837 | 4/1992 |
| DE | 195 21 678 | 6/1995 |
| DE | 19521678 | 6/1995 |
| DE | 195 21 678 | 12/1996 |
| DE | 197 27 295 | 1/1999 |
| DE | 198 30 470 | 11/1999 |
| DE | 20001385 | 1/2000 |
| DE | 200 01 385 | 8/2000 |
| EP | 0020055 | 5/1980 |
| EP | 0 020 055 | 12/1980 |
| EP | 0111911 | 6/1984 |
| EP | 0 254 137 | 1/1988 |
| EP | 0254137 | 1/1988 |
| EP | 0 585 898 | 9/1994 |
| FR | 2029424 | 10/1970 |
| GB | 1 031 799 | 2/1963 |
| GB | 1 004 046 | 9/1965 |
| GB | 1109439 | 4/1968 |
| GB | 1 204 781 | 9/1970 |
| GB | 1296889 | * 11/1972 |
| GB | 1 520 110 | 10/1974 |
| JP | 58-122022 | 7/1983 |
| JP | 61 72 035 | 4/1986 |
| JP | 61 072 035 | 4/1986 |
| JP | 61-254221 | 11/1986 |
| JP | 61-280217 | 12/1986 |
| JP | 63 12323 | 1/1988 |
| JP | 63 12324 | 1/1988 |
| JP | 63-016032 | 1/1988 |
| JP | 63012323 | 1/1988 |
| JP | 63012324 | 1/1988 |
| JP | 63-69525 | 3/1988 |
| JP | 63-69527 | 3/1988 |
| JP | 1-208310 | 8/1989 |
| JP | 1-305809 | 12/1989 |
| JP | 03-245811 | 1/1991 |
| JP | 04-200720 | 7/1992 |
| JP | 06-253682 | 9/1994 |
| JP | 2000-107895 | 4/2000 |
| JP | 2004-261757 | 9/2004 |
| JP | 2006-340683 | 12/2006 |
| JP | 2007-190529 | 8/2007 |
| RU | 511963 | 6/1976 |
| RU | 715120 | 2/1980 |
| RU | 1 828 406 | 7/1993 |
| RU | 2097115 | 11/1997 |
| SD | 1 828 406 | 7/1993 |
| WO | WO 98/16296 | 4/1998 |
| WO | WO 98/17388 | 4/1998 |
| WO | WO 98/22173 A | 5/1998 |
| WO | WO 00/50154 | 8/2000 |
| WO | WO 00/76633 | 12/2000 |
| WO | WO 01/21269 | 3/2001 |
| WO | WO 2005/108297 | 11/2005 |
| WO | WO 2006/009600 | 1/2006 |
| WO | WO 2006/036396 | 4/2006 |
| WO | WO 2006/084008 | 8/2006 |
| WO | WO 2007/016271 | 2/2007 |
| WO | WO 2007/016274 | 2/2007 |
| WO | WO 2007/114991 | 10/2007 |
| WO | WO 2008/042919 | 4/2008 |
| WO | WO 2008/131132 | 4/2008 |
| WO | WO 2008/061210 | 5/2008 |
| WO | WO 2009/149292 | 12/2009 |

OTHER PUBLICATIONS

Lackner et al., "Free-Market Approaches to Controlling Carbon Dioxide Emissions to the Atmosphere: A Discussion of the scientific basis", Los Alamos National Laboratory (Lackner & Ziock) & Harvard University (Wilson), pp. 1-16.

Lackner, Klaus S., "Can Fossil Carbon Fuel the $21^{st}$ Century?", International Geology Review, vol. 44, 2002, pp. 1122-1133.

"Extraction of Carbon Dioxide from the Atmosphere Through Engineered Chimical Sinkage", Dubey et al., Fuel Chemistry Division Preprints, 2001, pp. 1-4.

"Extraction CO2 from the Air", Lackner presentation, 12 pgs.

"Carbon Dioxide Extraction from Air: Is It an Option?", Lackner et al., Proceedings of the $24^{th}$ Annual Technical Conference on Coal Utilization and Fuel Systems, Mar. 8-11, 1999, pp. 885-896.

"Compensation of Atmospheric CO2 Buildup Through Engineered Chemical Sinkage", Elliott et al., pp. 1-8.

"Capturing Carbon Dioxide From Air", Lackner et al., pp. 1-15.

"The Case for Carbon Dioxide Extraction From Air", Lackner et al., Sourcebook, Sep. 1999, vol. 57, No. 9, pp. 6-10.

"An Industrial Sized Unit" Drawing and specification.

"Carbon Dioxide Extraction from Air", Lackner et al., Arguments pp. 1-5, no date.

"New Findings May Redefine Renewable Energy Debate", Bituin, found at http://www.dailycal.org/article.php?id=8559.

"Imagine No Restrictions on Fossil-Fuel Usage and No Global Warming!", Rickman, found at http://www.lanl.gov/news/releases/archive/02-028.shtml.

"In the Lab", Jason Hensel, found at www.eponline.com.

"Americans Believe in Global Warming . . . and Psychic Powers, Astrology, and UFO's", S. Fred Singer, found at http://heartland.org/.

"Science for Sustainability: From Capturing Carbon Dioxide From Air to Environmental Impact of a Hydrogen Economy", Dubey, found at http://www.mbari.org/seminars/2003/spring2003/apr2dubey.html.

"New Solutions to Oil Problems", Whitley Strieber's Unknown Country, 2002, found at http://www.unknowncountry.com/news/print.phtml?id=1467.

"Chemical Extraction of Carbon Dioxide from Air to Sustain Fossil Energy by Avoiding Climate Change", Dubey et al., $2^{nd}$ Annual Conference on Carbon Sequestration, 2003.

"Researchers Explore Extracting CO2 Directly From Air" found at http://www.earthvision.net/ColdFusion/News_Page1.cfm?NewsID=20309.

Abstracts of Eos. Trans. AGU, 83 (19), Spring Meeting 2002, 3 pgs.

Abstracts of Eos. Trans. AGU, 83 (47), Fall Meeting 2002, 3 pgs.

"Written Public Comments on the Strategic Plan for the U.S. Climate Change Science Program, General Comments", 2003, pp. 1-160.

Environment & Climate News, vol. 5, No. 7, Aug. 2002, 20 pgs.

"Carbon Sequestration Could Be Employed Today to Help Alleviate Greenhouse Emissions" found at http://ww.earthinstitute.columbia.edu/news/2003/story06-25-03b.html.

"CO2 Capture from the Air: Technology Assessment and Implications for Climate Policy", Keith et al., pp. 1-6.

Resume of David Keith, Spring 2005, 8 pgs. "Climate Strategy with CO2 Capture From the Air", Keith et al., found at http://ideas.respec.org/p/hal/papers/halshs-00003926_v1.html.

"Information About: David Keith" found at http://ideas.respec.org/e/pke74.html.

"Climate Strategy with CO2 Capture from the Air" Keith et al., Mar. 31, 2005, pp. 1-43.

Abstracts of Eos. Trans. AGU, 82 (47), Fall Meeting 2001, 3 pgs.

"The Carrot or the Stick: How to Build a Technology-Friendly Climate Policy in Canada" Presentation by David Keith, Climate Change Central Apr. 15, 2005, pp. 1-32.

Information on David Keith found at http://www.ucalgary.ca/~keith/.

J. Balster et al., "Multi-Layer Spacer Geometries With Improved Mass Transport", May 16, 2006, pp. 351-361.

T. Sata, "Monovalent Cation Permselective Exchange Membrane", Apr. 15, 1972, pp. 980-982.

Toshikatsu Sata, "Modification of Properties of Ion-Exchange Membranes. IV. Change of Transport Properties of Cation-Exchange Membranes by Various Polyelectrolyte", 1978, pp. 1063-1080.

Toshikatsu Sata, Yukio Mizutani, "Modification of Properties of Ion Exchange Membranes. VI. Electrodialytic Transport Properties of Cation Exchange Membranes with a Electrodeposition Layer of Cationic Polyelectrolytes", 1979, pp. 1199-1213.
Toshikatsu Sata, "Modification of Properties of Ion Exchange Membranes. VII. Relative Transport Number between Various Cations of Cation Exchange Membrane Having Cationic Polyelectrolyte Layer and Mechanism of Selective Permeation of Particular Cations", 1979, pp. 2071-2085.
U.S. Appl. No. 12/596,642, filed Oct. 19, 2009, Wright et al.
Abstracts of Eos. Trans. AGU, 82 (47), Fall Meeting 2001; pp. 3.
Abstracts of Eos. Trans. AGU, 83 (19), Spring Meeting 2002; pp. 3.
Abstracts of Eos. Trans. AGU, 83 (47), Fall Meeting 2002; pp. 3.
Balster et al., "Multi-Layer Spacer Geometries With Improved Mass Transport", 2006; pp. 351-361.
Bituin, "New Findings May Redefine Renewable Energy Debate", found at http://www.dailycal.org/article.php?id=8559.
"*Carbon Sequestration Could Be Employed Today to Help Alleviate Greenhouse Emissions*" found at http://www.earthinstitute.columbia.edu/news/2003/story06-25-03b.html.
Chinese Official Action dated May 5, 2010 and Jan. 20, 2011, Appln. No. 200680030297.X.
Chinese Official Action dated Dec. 3, 2010, Appln. No. 200780008015.
Choi et al. "A new preparation for cation-exchange membrane using monomer sorption into reinforcing materials" Desalination 146. Mar. 22, 2002.
Choi et al. "Characterization of LDPE/polystyrene cation exchange membranes prepared by monomer sorption and UV radiation polymerization" Journal of Membrane Science 223 (2003) 201-215. Jul. 13, 2003.
Choi et al. "Preparation and characterization of LPDE/polyvinvylbenzyl trimethyl ammonium salts anion-exchange membrane" Journal of Membrane Science 221 (2003) 219-231. Jun. 13, 2003.
Cuiming et al. "Fundamental Studies of a New Hybrid (Inorganic-Organic) Positively Charged Membrane: Membrane Preparation and Characterizations" Journal of Membrane Science 216 (2003) 269-278 Feb. 16, 2003.
Dow Chemical Company, Dowex Type 1 Strong Base Anion Resin, 1998, http://www.inaqua.de/Prod/ion/pdf_en/313_UPCORE_Mono_A625.pdf, p. 1.
Dubey et al., "Chemical Extraction of Carbon Dioxide from Air to Sustain Fossil Energy by Avoiding Climate Change", 2nd Annual Conference on Carbon Sequestration, 2003.
Dubey et al., "Extraction of Carbon Dioxide from the Atmosphere Through Engineered Chemical Sinkage", Fuel Chemistry Division Preprints, 2001; pp. 1-4.
Dubey, "Science for Sustainability: From Capturing Carbon Dioxide From Air to Environmental Impact of a Hydrogen Economy", found at http://www.mbari.org/seminars/2003/spring2003/apr2_dubey.html.
Elliot et al., "Compensation of Atmospheric CO2 Buildup Through Engineered Chemical Sinkage", pp. 1-8.
Environment & Climate News, 2002; vol. 5, No. 7.
Fuertes et al. "Carbon Composite Membranes from Matrimid and Kapton Polymides for Gas Separation" Microporous and Mesoporous Materials 33 (1999) 115-125 Jun. 16, 1999.
Hashimoto et al., "Global CO2 recycling", (1996) Zairyo to Kankyo/Corrosion Engineering, 45 (10), pp. 614-620 (Abstract only).
Hensel, "In the Lab", found at www.eponline.com/articles/53584.
"Information About David Keith" found at http://ideas.respec.org/e/pke74.html, http://www.ucalgary.ca/~keith/.
International Preliminary Report on Patentability, Dated Jan. 24, 2008 PCT/US2006/003646.
International Preliminary Report on Patentability, mailed Jun. 10, 2010 PCT/US2007/063607.
International Preliminary Report on Patentability, Aug. 11, 2009 PCT/US2009/053461.
International Preliminary Report on Patentability, Aug. 24, 2009 PCT/US2009/054795.
International Preliminary Report on Patentability, mailed Feb. 24, 2011, PCT/US09/53461.
International Preliminary Report on Patentability, Nov. 15, 2007 PCT/US2007/084880.
International Preliminary Report on Patentability, Jan. 27, 2009, PCT/US2007/84237.
International Preliminary Report on Patentability, Oct. 20, 2009, PCT/US2008/60672.
International Preliminary Report on Patentability, May 11, 2010, PCT/US2008/82505.
International Preliminary Report on Patentability, Dec. 6, 2010, PCT/US2009/46306.
International Preliminary Report on Patentability, Jun. 1, 2010, PCT/US2007/80229.
International Preliminary Report on Patentability, Jan. 29, 2008, PCT/US2006/029238.
International Search report and Written Opinion Feb. 2, 2006 PCT/US2006/003646.
International Search report and Written Opinion Jul. 28, 2006 PCT/US2006/029238.
International Search report and Written Opinion mailed Feb. 25, 2008 PCT/US2007/63607.
International Search report and Written Opinion mailed Mar. 8, 2008 PCT/US2007/80229.
International Search report and Written Opinion mailed Apr. 23, 2008 PCT/US2007/84880.
International Search report and Written Opinion mailed Sep. 15, 2008 PCT/US2008/60672.
International Search report and Written Opinion mailed Dec. 24, 2008 PCT/US2008/82505.
International Search report and Written Opinion mailed Sep. 25, 2009 PCT/US2009/53461.
International Search report and Written Opinion mailed Dec. 9, 2009 PCT/US2009/54795.
International Search report and Written Opinion mailed Jan. 27, 2009 PCT/US2008/84237.
International Search report and Written Opinion mailed Sep. 3, 2009 PCT/US2009/46306.
International Search Report and Written Opinion dated Oct. 4, 2006 PCT/US05/29584.
International Preliminary Report on Patentability dated Feb. 20, 2007 PCT/US05/29584.
Japanese Official Action, Application Serial No. 2009-531567, dated Feb. 7, 2011, 4 pgs.
Japanese Official Action, Application Serial No. 2008-524154, dated Feb. 16, 2011, 4 pgs.
Keith et al., "Climate Strategy with CO2 Capture from the Air" 2005; pp. 1-43.
Keith et al., "CO2 Capture From the Air: Technology Assessment and Implications for Climate Policy", pp. 1-6.
Keith et al., Resume of David Keith, Spring 2005, 8 pgs. "Climate Strategy with CO2 Capture From the Air", found at http://ideas.repec.org/p/hal/papers/halshs-00003926_v1.html.
Lackner et al., "Capturing Carbon Dioxide From Air", pp. 1-15.
Lackner et al., "Carbon Dioxide Extraction from Air?", Arguments pp. 1-5.
Lackner et al., "Carbon Dioxide Extraction from Air: Is It an Option?", Proceedings of the 24th Annual Technical Conference on Coal Utilization and Fuel Systems, 1999; pp. 885-896.
Lackner et al., "CO2 Extraction from Air" A White Paper from Los Alamos National Labs, The Reddy Corporation International, Sourcebook, Sep. 1999 (12 PGS).
Lackner et al., "The Case for Carbon Dioxide Extraction From Air," Sourcebook, Sep. 1999; vol. 57, No. 9, pp. 6-10.
Lackner K.S., Grimes P., Ziock H-J, 'Capturing Carbon Dioxide from Air' First National Conference on Carbon Sequestration (Washington) 2001.
"Extraction CO2 from the Air", Lackner presentation, 12 pages.
Liang "Carbon Dioxide Capture From Flue Gas Using Regenerable Sodium-Based Sorbents", dated Aug. 1, 2003, Department of Chemical Engineering Thesis, (137 pgs).
Liu et al., "Composite Membranes from Photochemical Synthesis of Ultrathin Polymer Films" Nature vol. 352 Jul. 4, 1991.
Mexican Official Action, Dated Jan. 24, 2011, Serial No. MX/a/2007/002019.
Mexican Official Action, Dated Feb. 2, 2011, Serial No. MX/a/2008/011464.

Mizutani, Y "Structure of Ion Exchange Membranes" Journal of Membrane Science 49 (1990) 121-144 Aug. 21, 1989.
Murdoch et al., "Sabatier Methanation Reactor for Space Exploration", (2005) A Collection of Technical Papers—1st Space Exploration Conference: Continuing the Voyage of Discovery, 2, pp. 981-987 (Abstract only).
Office Action dated Sep. 11, 2009 in U.S. Appl. No. 11/209,962.
Office Action dated Feb. 23, 2010 in U.S. Appl. No. 11/209,962.
Office Action dated Jun. 9, 2010 in U.S. Appl. No. 11/209,962.
Office Action dated Aug. 27, 2010 in U.S. Appl. No. 11/209,962.
Office Action dated Feb. 1, 2011 in U.S. Appl. No. 11/209,962.
Office Action dated Oct. 1, 2009 in U.S. Appl. No. 11/227,660.
Office Action dated Jan. 27, 2010 in U.S. Appl. No. 11/227,660.
Office Action dated Oct. 7, 2010 in U.S. Appl. No. 11/227,660.
Office Action dated Jan. 25, 2011 in U.S. Appl. No. 11/227,660.
Office Action dated Mar. 30, 2009 in U.S. Appl. No. 11/346,522.
Office Action dated Jun. 17, 2009 in U.S. Appl. No. 11/346,522.
Office Action dated Oct. 7, 2009 in U.S. Appl. No. 11/683,824.
Office Action dated Mar. 15, 2010 in U.S. Appl. No. 11/683,824.
Office Action dated Jun. 28, 2010 in U.S. Appl. No. 11/683,824.
Office Action dated Nov. 19, 2010 in U.S. Appl. No. 11/683,824.
Office Action dated Nov. 10, 2010 in U.S. Appl. No. 11/996,615.
Office Action dated Apr. 6, 2011 in U.S. Appl. No. 11/996,615.
Office Action dated Nov. 9, 2010 in U.S. Appl. No. 12/638,717.
Office Action dated Feb. 11, 2011 in U.S. Appl. No. 12/638,717.
Office Action dated Mar. 11, 2011 in U.S. Appl. No. 12/903,962.
Office Action dated Mar. 11, 2011 in U.S. Appl. No. 12/903,967.
Office Action dated Mar. 11, 2011 in U.S. Appl. No. 12/903,970.
Office Action dated Mar. 11, 2011 in U.S. Appl. No. 12/903,974.
Office Action dated Mar. 11, 2011 in U.S. Appl. No. 12/903,981.
Official Action dated Mar. 28, 2011 in U.S. Appl. No. 12/389,213.
Official Action dated Mar. 15, 2010, U.S. Appl. No. 11/683,824, 10 pgs.
Official Action for U.S. Appl. No. 11/209,962, dated Sep. 11, 2009, (16 pgs).
Official Action issued in Applicants' counterpart Chinese Patent Application Serial No. 200680003905.8 dated Jun. 12, 2009.
Official Action issued in Applicants' counterpart European Patent Application Serial No. 05 793 918.3-1213 dated Jan. 19, 2010.
Official Action issued in Applicants' counterpart European Patent Application Serial No. 06 788 685.3-1213 dated Oct. 16, 2009.
Official Action issued in Applicants' counterpart European Patent Application Serial No. 07 758 183.3 dated Jun. 22, 2010.
Official Action issued in Applicants' counterpart European Patent Application Serial No. 07864483.8 dated Jan. 7, 2011.
Official Action issued in Applicants' counterpart Russian Patent Application Serial No. 2008139902 (051576) dated Feb. 4, 2011.
Official Action issued in Applicants' counterpart Russian Patent Application Serial No. 2008139902 dated Nov. 19, 2010.
Official Action received in Applicants' related Australian Patent Application Serial No. 2005290082 dated Apr. 20, 2007.
Official Action received in Applicants' related Australian Patent Application Serial No. 2005290082 dated Mar. 5, 2010.
Official Action received in Applicants' related Australian Patent Application Serial No. 2005290082 dated Apr. 13, 2010.
Official Action received in Applicants' related Australian Patent Application Serial No. 2005290082 dated May 20, 2010.
Official Action received in Applicants' related Australian Patent Application Serial No. 2005290082 dated Jul. 22, 2010.
Official Action received in related Australian Patent Application Serial No. 2006210619 dated Mar. 1, 2010.
Official Action received in Applicants' related Australian Patent Application Serial No. 2007233275 dated Jan. 14, 2011.
Official Action received in Applicants' related Australian Patent Application Serial No. 2007303240 dated Feb. 9, 2011.
Official Action received in Applicants' related New Zealand Patent Application Serial No. 575870 dated Mar. 17, 2011 and Nov. 11, 2010.
"Researchers Explore Extracting CO2 Directly From Air" found at http://www.earthvision.net/ColdFusion/News_Page1.cfm?NewsID=20309.
Resume of David Keith, Academic CV, Spring 2005, 8 pgs.
Rickman, "Imagine No Restriction on Fossil-Fuel Usage and No Global Warming!", found at http://www.lanl.gov/news/releases/archive/02-028.shtml.
Russian Official Action+Translation, dated Feb. 2, 2006, Appln. No. 2007132880/15 (035886).
Russian Official Action+Translation, dated Sep. 15, 2010 Appln. No. 2007132880/15 (035886).
Russian Official Action+Translation, dated Feb. 11, 2010, Appln. No. 2007132880/15, (13 pgs).
Singer, Fred S., "Americans Believe in Global Warming . . . and Psychic Powers, Astrology, and UFO's", found at http://heartland.org/.
Snowpure, LLC, SnowPure Excellion Product Information and Brochure, Aug. 2009.
Sun et al., "$CO_2$ sorption in activated carbon in the presence of water", dated Feb. 9, 2007, Science Direct, Chemical Physics Letterse 437 (2000) (abstract enclosed).
T.Sata, "Monovalent Cation Permselective Exchange Membrane", Apr. 15, 1972, pp. 980-982.
Toshikatsu Sata, "Modification of Properties of Ion Exchange Membranes. IV. Change of Transport Properties of Cation-Exchange Membranes by Various Polyelectrolytes", 1978, pp. 1063-1080.
Toshikatsu, Yukio Mizutani, "Modification of Properties of Ion Exchange Membranes. VI. Electrodialytic Transport Properties of Cation Exchange Membranes with a Electrodeposition Layer of Cationic Polyelectrolytes", 1979, pp. 1199-1213.
Toshikatsu, Yukio Mizutani, "Modification of Properties of Ion Exchange Membranes. VII. Relative Transport Number between Various Cations of Cation Exchange Membrane Having Cationic Polyelectrolyte Layer and Mechanism of Selective Permeation of Particular Cations", 1979, pp. 2071-2085.
Yin, et al., "Absorption and steam desorption performance of weak base anion exchange resin" (1995) Hangtian Yixue Yu Yixue Gongcheng/Space Medicine and Medical Engineering, 8 (1), pp. 27-31. (Abstract only).
"Carbon Dioxide Extraction From Air", Lackner et al., Arguments pp. 1-5.
"Climate Strategy with $CO_2$ Capture from the Air" Keith et al., Mar. 31, 2005, pp. 1-43.
"$CO_2$ Capture From the Air: Technology Assessment and Implications for Climate Policy", Keith et al., pp. 1-6.
"Compensation of Atmospheric $CO_2$ Buildup Through Engineered Chemical Sinkage", Elliot et al., pp. 1-8.
"Extraction of Carbon Dioxide from the Atmosphere Through Engineered Chemical Sinkage", Dubey et al., Fuel Chemistry Division Preprints, 2001, pp. 1-4.
"$CO_2$ Extraction from Air", Lackner et al.
"Imagine No Restriction on Fossil-Fuel Usage and No Global Warming!", Rickman, found at http://www.lanl.gov/news/releases/archive/02-028.shtml.
"In the Lab", Jason Hensel, found at www.eponline.com/articles/53584.
"Information About: David Keith" found at http://ideas.respec.org/e/pke74.html, http://www.ucalgary.ca/~keith/.
"Science for Sustainability: From Capturing Carbon Dioxide From Air to Environmental Impact of a Hydrogen Economy", Dubey, found at http://www.mbari.org/seminars/2003/spring2003/apr2_dubey.html.
"*The Carrot or the Stick: How to Build a Technology-Friendly Climate Policy in Canada*" Presentation by David Keith, Climate Change Central Apr. 15, 2005, pp. 1-32.
"The Case for Carbon Dioxide Extraction From Air," ($CO_2$ Extraction From Air, A White Paper from Los Alamos National Labs) Lackner et al., Sourcebook, Sep. 1999, vol. 57, No. 9, pp. 6-10.
"*Written Public Comments on the Strategic Plan for the U.S. Climate Change Science Program, General Comments*", 2003, pp. 1-160.
Official Action issued in Applicants' counterpart Chinese Patent Application Serial No. 200680030297.
Russian Official Action+Translation, dated Feb. 11, 2010, Appln. No. 2007132880/15 (05886), (13 pgs).
Liang, "Carbon Dioxide Capture From Flue Gas Using Regenerable Sodium-Based Sorbents", dated Aug. 1, 2003, Department of Chemical Engineering Thesis, (137 pgs).

Official Action received in related Chinese Patent Application Serial No. 200680030297.
Official Action received in related Australian Patent Application Serial No. 2006210619.
Canadian Official Action dated Jun. 21, 2011, Appln. No. 2,577,685.
Chinese Official Action dated Apr. 28, 2011 Appln. No. 200780042511.8.
Chinese Official Action dated Jun. 13, 2011, Appln. No. 200780008015.0.
Huang, Houping and Chang, Shih-Ger "Method to Regenerate Ammonia for the Capture of Carbon Dioxide" Energy and Fuels 2002, 16, 904-910.
International Search Report and Written Opinion dated Nov. 24, 2010 GCC/P/2007/9020.
Israel Official Action, Application Serial No. 25585/09, dated Jun. 30, 2011.
Japanese Official Action, Application Serial No. 2008-524154, dated May 31, 2011, 3 pgs.
Office Action dated Aug. 3, 2011 in U.S. Appl. No. 12/903,962.
Office Action dated Aug. 1, 2011 in U.S. Appl. No. 12/903,974.
Official Action dated Jul. 1, 2011 in U.S. Appl. No. 13/102,915.
Official Action issued in Applicants' counterpart European Patent Application Serial No. 07 758 183.3-1213 dated Jul. 4, 2011.
Official Action issued in Applicants' counterpart European Patent Application Serial No. 07 853 742.0-1213 dated Jul. 27, 2011.
Official Action issued in Applicants' counterpart European Patent Application Serial No. 08 746 144.8-2113/2139584 dated May 9, 2011.
Official Action issued in Applicants' counterpart Russian Patent Application Serial No. 2009116621/05 (022802) dated Jun. 1, 2011.
Official Action received in Applicants' related Australian Patent Application Serial No. 2010241388 dated Jul. 7, 2011.
Official Action received in Applicants' related Australian Patent Application Serial No. 2007319211 dated Jun. 17, 2011.
Official Action received in Applicants' related Australian Patent Application Serial No. 2007233275 dated Jun. 1, 2011.
Official Action received in Applicants' related Mexican Patent Application Serial No. MX/a/2007/009081, dated Jul. 18, 2011.
Official Action received in Applicants' related New Zealand Patent Application Serial No. 575870 dated Jun. 27, 2011.
European Official Action, Serial No. 06 788 685.3-1213, dated Oct. 12, 2011 (3 pages).
Mexican Official Action, Serial No. MX/a/2009/003500, dated Oct. 12, 2011 (3 pages).
Mexican Official Action, Serial No. MX/a/2007/002019, dated Aug. 31, 2011 (Mexico Attorney notified Attorney of record in instant application on Sep. 22, 2011) (2 pages).
Russian Official Action, Serial No. 2008139902/15, dated Jul. 20, 2011 (Russian Attorney notified Attorney of record in instant application on Sep. 15, 2011) (6 page).
Russian Official Action, Serial No. 200914222/05, dated Sep. 30, 2011 (9 pages).
US Official Action, U.S. Appl. No. 12/274,986, dated Nov. 3, 2011 (36 pages).
US Official Action, U.S. Appl. No. 13/208,156, dated Oct. 26, 2011 (21 pages).
US Official Action, U.S. Appl. No. 11/209,962, dated Oct. 6, 2011 (24 pages).
US Official Action, U.S. Appl. No. 12/615,971, dated Sep. 29, 2011 (33 pages).
US Official Action, U.S. Appl. No. 13/102,915, dated Sep. 27, 2011 (10 pages).
US Official Action, U.S. Appl. No. 12/389,213, dated Sep. 27, 2011 (27 pages).
US Notice of Allowance, U.S. Appl. No. 12/265,556, dated Nov. 7, 2011 (33 pages).

* cited by examiner

COLLECTOR "OPERATING"

PLAN VIEW

COLLECTOR "OPEN"

COLLECTOR "CLOSED"

CARBONATE RECOVERY AND AMINE-CARBON DIOXIDE SEPARATION

REMOVAL OF CARBON DIOXIDE FROM AIR

The present invention relates to removal of selected gases from air. The invention has particular utility for the extraction of carbon dioxide ($CO_2$) from air and will be described in connection with such utilities, although other utilities are contemplated.

Extracting carbon dioxide ($CO_2$) from ambient air would make it possible to use carbon-based fuels and deal with the associated greenhouse gas emissions after the fact. Since $CO_2$ is neither poisonous nor harmful in parts per million quantities but creates environmental problems simply by accumulating in the atmosphere, it is desirable to remove $CO_2$ from air in order to compensate for emissions elsewhere and at different times. The overall scheme of air capture is well known.

The production of $CO_2$ occurs in a variety of industrial applications such as the generation of electricity power plants from coal and in the use of hydrocarbons that are typically the main components of fuels that are combusted in combustion devices, such as engines. Exhaust gas discharged from such combustion devices contains $CO_2$ gas, which at present is simply released to the atmosphere. However, as greenhouse gas concerns mount, $CO_2$ emissions from all sources will have to be curtailed. For mobile sources the best option is likely to be the collection of $CO_2$ directly from the air rather than from the mobile combustion device in a car or an airplane. The advantage of removing $CO_2$ from air is that it eliminates the need for storing $CO_2$ on the mobile device.

Various methods and apparatus have been developed for removing $CO_2$ from air. In one of these, air is washed with an alkaline solution or sorbent in tanks filled with what are referred to as Raschig rings. For the elimination of small amounts of $CO_2$, gel absorbers also have been used. Although these methods are efficient in removing $CO_2$, they have a serious disadvantage in that for them to efficiently remove carbon dioxide from the air, the air must be driven by the sorbent at a fairly high pressure, because relatively high pressure losses occur during the washing process. Furthermore, in order to obtain the increased pressure, compressing means of some nature are required and these means use up a certain amount of energy. This additional energy used in compressing the air can have a particularly unfavorable effect with regard to the overall carbon dioxide balance of the process, as tie energy required for increasing the air pressure would produce its own $CO_2$ that would have to be captured and disposed of.

Thus, since the prior art methods result in the inefficient capture of $CO_2$ from air because these processes heat or cool the air, or change the pressure of the air by substantial amounts, i.e., the net reduction in $CO_2$ is negligible as the cleaning process introduces $CO_2$ into the atmosphere as a byproduct of the generation of electricity used to power the process.

Furthermore, while scrubber designs for separating $CO_2$ from air already exist, generally they are limited to packed bed type implementations whose goal typically is to remove all traces of an impurity from another gas. One such device, described in U.S. Pat. No. 4,047,894, contains absorption elements comprising porous sintered plates made of polyvinylchloride (PVC) or carbon foam assembled spaced from one another in a housing. Prior to the plates being assembled in the housing, potassium hydroxide is impregnated in the porous plates. Such a device has the disadvantage that the sorbent material used to separate $CO_2$ from air cannot be replenished without disassembling the device housing.

Processes that collect $CO_2$ from the air typically rely on solvents that either physically or chemically bind $CO_2$ from the air. A class of practical $CO_2$ solvents include strongly alkaline hydroxide solutions such as, for example, sodium and potassium hydroxide. Hydroxide solutions in excess of 0.1 molarity can readily remove $CO_2$ from air where it becomes bound, e.g., as a carbonate. Higher hydroxide concentrations are desirable and an efficient air contactor will use hydroxide solutions in excess of 1 molar. Sodium hydroxide is a particular convenient choice, but other solvents such as organic amines may be used. Yet another choice of sorbents include weaker alkaline brines such as sodium or potassium carbonate brines.

See also, PCT Published Applications PCT/US2005/015453 and PCT/US2005/015454.

The foregoing discussion of the prior art derives primarily from our earlier Published PCT Application PCT/US05/29979 in which there is proposed a system for removing carbon dioxide from air, which comprises exposing solvent covered surfaces to airstreams where the airflow is kept laminar, or close to the laminar region. The carbon dioxide gas is absorbed by the solvent and removed from the air. In a preferred embodiment, the solvent comprises an alkaline sorbent solution such as a strong hydroxide solution. See also, our earlier published PCT Application Ser. No. PCT(US06/03646 in which we describe an air/liquid exchanger comprising an open-cell foam for supporting a liquid sorbent.

The present invention provides improvements over the prior art as described above. More particularly, the present invention provides several processes and systems for removing carbon dioxide or other gases of interest from air.

In accordance with one embodiment of the invention, there is provided an ion exchange material to capture or absorb $CO_2$. In one aspect, the invention employs a solid anionic exchange membrane as the primary $CO_2$ capture matrix. The ion exchange material may comprise a solid matrix formed of or coated with an ion exchange material. Alternatively, the material may comprise a cellulose based matrix coated with an ion exchange material.

Yet another embodiment of the invention employs a wetted foam air exchanger that uses a sodium or potassium carbonate solution, or other weak carbon dioxide sorbent, to absorb carbon dioxide from the air to form a sodium or potassium bicarbonate. The resulting sodium or potassium bicarbonate is then treated to refresh the carbonate sorbent which may be recovered and disposed of while the sorbent is recycled.

In yet another embodiment of the invention, carbon dioxide is removed from the air using an ion exchange material which is regenerated using a liquid amine solution which is then recovered by passing the amine solution into an electrodialysis cell.

In still yet another aspect of the invention, carbon dioxide is removed from the air by modifying the alkalinity of seawater which in turn increases the flux of carbon dioxide from the atmosphere into the water.

Further features and advantages of the present invention will be seen from the following detailed description, taken in conjunction with the accompanying drawings, wherein like numerals depict like parts, and wherein FIG. 1(a) is a side elevational view, in partial cross-section and FIG. 1(b) is a perspective view of yet alternative forms of air scrubbers made in accordance with another embodiment of the present invention;

FIGS. 2(a)-2(c), 3(a)-3(b) and 4(a)-4(c) are perspective or side elevational views, as the case may be, of air scrubbing units made in accordance with yet other embodiments of the present invention;

FIG. 5 is a block flow diagram illustrating a process for removing $CO_2$ from air in accordance with one embodiment of the invention;

FIGS. 6-8 graphically illustrate the $CO_2$ capture over time;

Figure 1A:
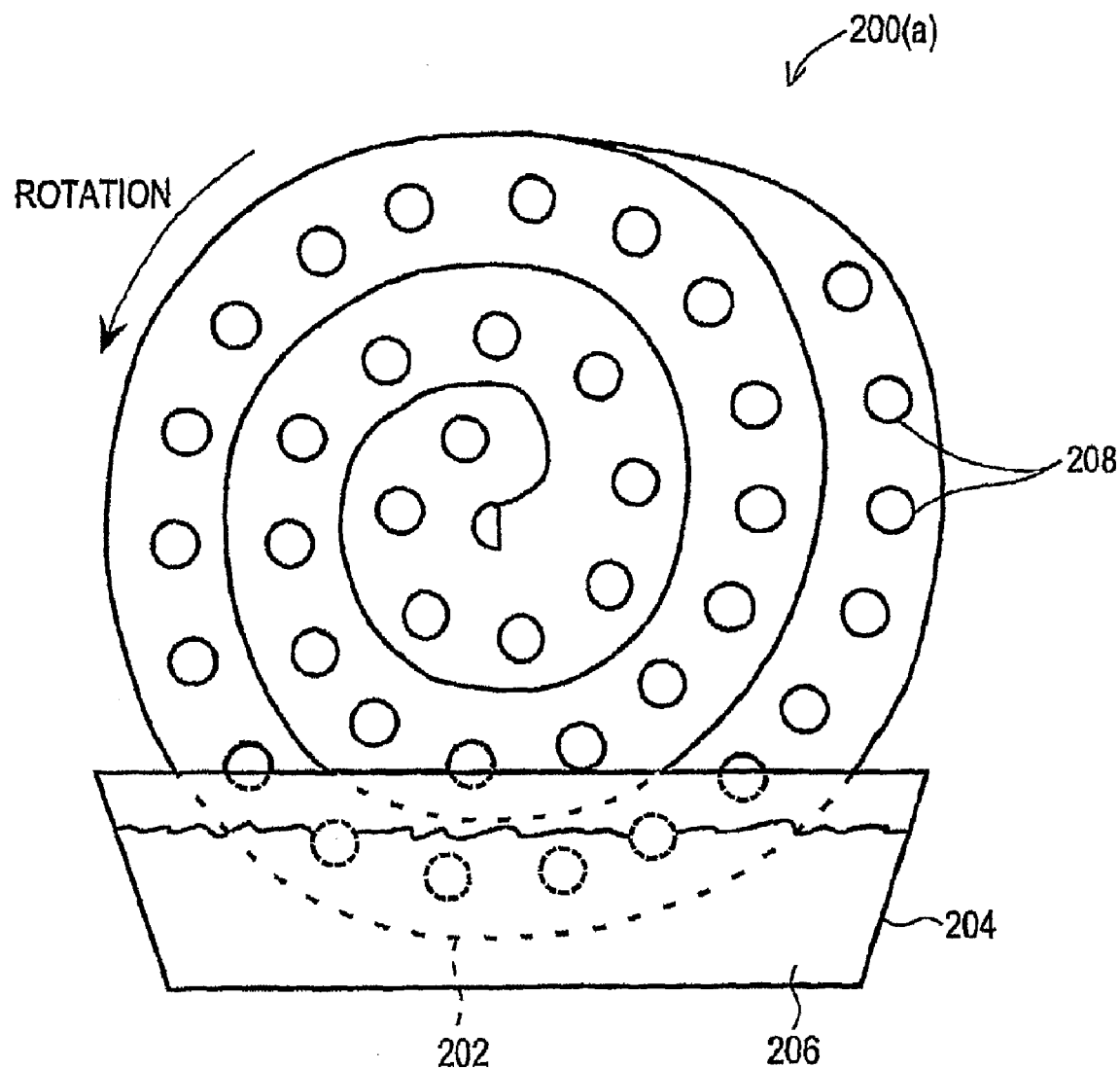

The present invention generally relates to carbon dioxide ($CO_2$) extraction, reduction, capture, disposal, sequestration or storage, particularly from air, and involves new processes and apparatuses to reduce or eliminate $CO_2$ from the environment. Both extraction and sequestration of $CO_2$ are encompassed by the invention.

In our earlier U.S. Patent Application Ser. No. 60/603,811, we outlined a strategy for contacting air with sorbent coated surfaces. We showed, that with the slow reaction kinetics typical of hydroxide or carbonate solutions absorbing $CO_2$, one should provide straight channels for laminar flow to maximize the uptake of $CO_2$ for a given energy investment in pressure drop across the collecting structure. If the liquid side reaction kinetics could be improved, more complex channels would reduce the air side limitation, but for low reaction kinetics straight channels with smooth surfaces appear most effective.

This invention in one aspect provides an approach for absorbing carbon dioxide from an air stream that can proceed efficiently even with weak sorbents and at low uptake rates. By wetting a foam, which has straight channels cut through it, in a manner that internal foam surfaces are fully or partially covered with a weak sorbent, it is possible to create a large area of sorbent surface that is exposed to a slow gas flow. The gas flow through the channels and through the bulk foam can be adjusted so as to optimize the uptake of dilute carbon dioxide for a given pressure drop across multiple layers of foam. For the extraction of low concentration gas admixtures to a gas stream this technique obviates the need for strong sorbents with a fast rate of absorption. As a consequence one can take advantage of weak sorbents like sodium carbonate for capturing $CO_2$ from air, rather than having to rely on strong sorbents like sodium hydroxide. The lower binding energy of carbon dioxide to the weak sorbent greatly simplifies subsequent sorbent recovery steps. This disclosure describes the principles involved and outlines a method and apparatus to create moist foam surfaces and to extract the $CO_2$ laden sorbent from the foam. These methods can be used with any applicable sorbent recovery method. They are not limited to the capture of carbon dioxide from the air, but could be extended easily to the capture of trace gas admixtures from any gas stream. As outlined below, the details of the implementation will depend on the concentration of the trace gas, the rate of the adsorption or absorption reaction and the flow speeds involved. It also matters whether the goal of the process is to capture all of the trace gas out of the mixture in order to clean up the gas, or whether the goal is to collect a valuable stream of trace gas from the mixture without attempting to eliminate nearly all traces from the carrier gas.

In collecting carbon dioxide from the air, two distinct transfer steps could potentially set the rate limit. The first is the uptake of carbon dioxide into the sorbent, the second is the transport of carbon dioxide through an airside boundary layer to the surface of the sorbent. In the first case the capture system is sorbent-side limited in the second it is air-side limited. In an earlier published PCT Application Ser. No. PCT/US06/03646, we outlined one approach to optimizing a $CO_2$ capture device from a dilute stream. Here we outline another approach that takes advantage of a very different principle. Both approaches aim to minimize the pressure drop required across a scrubbing device for removing a certain fraction of the $CO_2$ from the air flow. Since CO2 in the air is very dilute, it is important to minimize the energy penalty for pushing air through the air scrubbing system. Ideally, the pressure drop is so small, that the partial stagnation of natural wind flows is sufficient to provide the energy for making contact between the air and the sorbent material.

The aforesaid previous invention provides a method of minimizing the pressure drop for a fixed flow velocity, by assuring that the $CO_2$ transport is at least partially airside limited. For weak sorbents like alkaline solutions this suggests a laminar flow which generates boundary layers thick enough to roughly equalize the air-side mass transport coefficient and the sorbent side transfer coefficient. This invention by contrast is concerned with partitioning the air flow into fast moving and slowly moving streams and inserting the scrubber into the stream where it flows slowly.

As a particular design we consider a filter device in which the distances between nearest neighbor absorbing surfaces are small compared to the allowable boundary layer thickness. In that case the $CO_2$ concentration on the surface is not much reduced and consequently the system can be considered sorbent side limited. In such a system the fractional loss of momentum is large compared to the fractional loss of carbon dioxide. As one lowers the speed of the airflow, the system remains sorbent-side limited and the fractional loss of momentum still remains high, but the available momentum drops rapidly. Hence the total loss in momentum is reduced for a given thickness of the filter system. The pressure drop can be even further reduced, as the longer residence time of the air in the filter will lead to a higher reduction in $CO_2$ content of the air. If one holds the fractional $CO_2$ extraction constant the filter can be made thinner and thus the required pressure drop is even further reduced.

However, if the total flow through the collector is to remain constant the slowdown of the flow in the filter must be accompanied by a speed-up of another stream. This can be accomplished by partitioning an air stream into two streams. Both streams simultaneously are run through a filter. The system experiences a pressure drop which is governed by the thickness of the filter, and the flow speed of the air. In panel B) the flow pattern has been reorganized so that one stream is first expanded out, while the other part is made to converge. As a result the air in the widening section slows down, while the air in the narrowing section speeds up. At the point of maximum cross section a filter is installed into the slow flow. Downstream from this point, the expanded air flow is made to converge again and the other air stream fans out to the same extended cross section the first flow had higher upstream. At this point the air in the second stream is scrubbed of all or part of its $CO_2$. A final section follows where both streams are readjusted to their initial cross-section. In order to achieve the same filter affiance, the filters in this new design can be substantially thinner. If the system is sorbent side limited, then the volume of the filter does not need to change, but since the cross section increased the thickness of the filter can be reduced accordingly. The pressure drop is reduced because the flow speed is lower and the resistance of the filter is reduced.

The above example serves to explain a basic physical principle. In the following we outline a specific method of approximating such a behavior with simple blocks of foam like filter material. Foam blocks have many advantages: They can be shaped into arbitrary forms, they can hold some liquid and they are easily wetted; and open cell foams present a large internal surface area that can be used to absorb $CO_2$ from air flowing through the foam.

A large foam block wetted with a liquid sorbent like NaOH or $Na_2CO_3$ will absorb $CO_2$ from the air. If we assume a typical pore size of about 1 mm and a specific area of about 4000 $m^{-1}$, then a typical uptake rate for a sorbent surface of about 2 $\mu mol\ m^{-2}s^{-1}$ would provide an uptake capacity of 8 mmol $s^{-1}$ for a foam block of one cubic meter. If we intend to extract 5 mmol/$m^3$ from the air stream, the thickness of the apparatus at flow speeds of 3 m/sec would be about 2 m. However, the pressure drop of solid block of foam would be far too large to maintain such a high flow speed. If, however, one opens up channels through the foam that let 90% of the air bypass a foam layer, and then mix the air again and go through another layer with 90% bypass, then the effective flow speed in the foam is ten times smaller, the pressure drop is reduced by a factor of ten, and the uptake rate is virtually unchanged as it is not limited by the rate at which air flows through the thin slices, but by the rate at which the surfaces inside these foam slices can absorb CO2.

By forming small straight channels through a layer of foam, one opens a pathway through the foam that will allow the bulk of the air a path that avoids going through the foam. By adjusting the total cross section of the holes, and the diameter of the holes it is possible to control the relationship between pressure drop and flow speed, and the fraction of the flow that actually goes through the holes.

Small diameter holes at a fixed flow rate will lead to a higher pressure drop, or alternatively at a fixed pressure drop they will lead to a higher flow rate. A practical system operates between the two limits where adjustment of the hole diameter and the number of holes will change the overall resistance to flow and thus change pressure drop and flow speed.

Increasing the number of holes will increase the flow rate, and hence reduce the pressure drop across the foam block. The pressure drop across the foam block in turn controls the flow speed through the bulk of the foam. It is therefore possible to adjust the parameters of this system in a way that optimizes a specific apparatus in that one controls its pressure drop, across the foam block, and independently the size of the bypass flow.

Finally, one generalization of these concepts: The concepts are not limited to extracting $CO_2$ from air, but they can be easily generalized to the extraction of any trace gas from any gas stream. Finally, while in most of the above discussion we assumed that the absorber is a liquid that is absorbed by the foam, it is of course also possible to consider foam like solid materials, including mats of fibers or other structures, that can absorb $CO_2$ as it passes through the system.

In contrast to experiments performed with AQUAFOAM®, which is a very hydrophilic phenolic foam that easily retains liquid and thus has pores completely filled with liquid, the polyurethane foams were essentially stripped of 80 to 90% of the volume of liquid it contained at the point of immersion. In contrast to the experiments on phenolic foams (AQUAFOAM®), in experiments with polyurethane foam the duration of uptake was greatly reduced from days or weeks to tens of minutes. In return the rate of uptake was greatly enhanced for a weak sorbent like a half molar sodium carbonate solution. The critical difference between the two experiments is that in the former experiments the foam is filled with fluid, whereas in the latter the foam volume is in its majority filled with gas. Intermittent soaking of the polyurethane foam block during the experiment, which would fill the pore space with liquid, lead to an immediate reduction in $CO_2$ uptake which only recovered after the liquid level contained in the foam had been appropriately reduced.

While the $CO_2$ uptake of a carbonate solution is greatly enhanced, the rate of water evaporation is essentially unchanged. Water evaporation is not sorbent side limited and hence the gas stream moving through the foam block is immediately water saturated and thus stops soaking up additional water. However, in most designs it will not be possible to take advantage of this effect, as a system that maximizes $CO_2$ uptake will contact all of the air and thus saturate all of the air with water vapor.

The role of hydrophilic vs. hydrophobic vs. mixed surfaces is at this point not fully understood. Each have advantages and disadvantages. Hydrophobicity controls the amount of liquid retained in the foam and the ease with which this liquid can be applied evenly. Thus, it is believed that a hydrophilic phenolic foam with slightly larger than usual pore sizes could combine excellent wetting properties with an appropriate low water retention level. Most commercially available phenolic foams are designed to retain water, and thus are not well suited to this application.

Various foams are commercially available and can be used. These include hard foams that would crush and be mechanically destroyed if subjected to significant compression, soft elastic foams that can be "squeezed." Hard foams can only be flushed with fluid. In order to maintain an appropriate level of saturation, it is necessary to let such foams drain. On the other hand, it is possible to push liquid out of the foam by driving a gas like air under pressure into the foam matrix.

Unevenness in flow patterns, draining and drying rates can render the use of these foams very challenging. In the case of soft, elastic foams it is possible to move liquid into and out of the foam by compressing the foam matrix. In the case of hard foams turning the foams will help in evenly distributing fluid throughout the volume of the foam.

A second aspect of this first embodiment thus is concerned with the application and extraction of liquid from soft and elastic foam structures as well as from foams that cannot be compressed without damaging the foam structure.

Figure 1B:
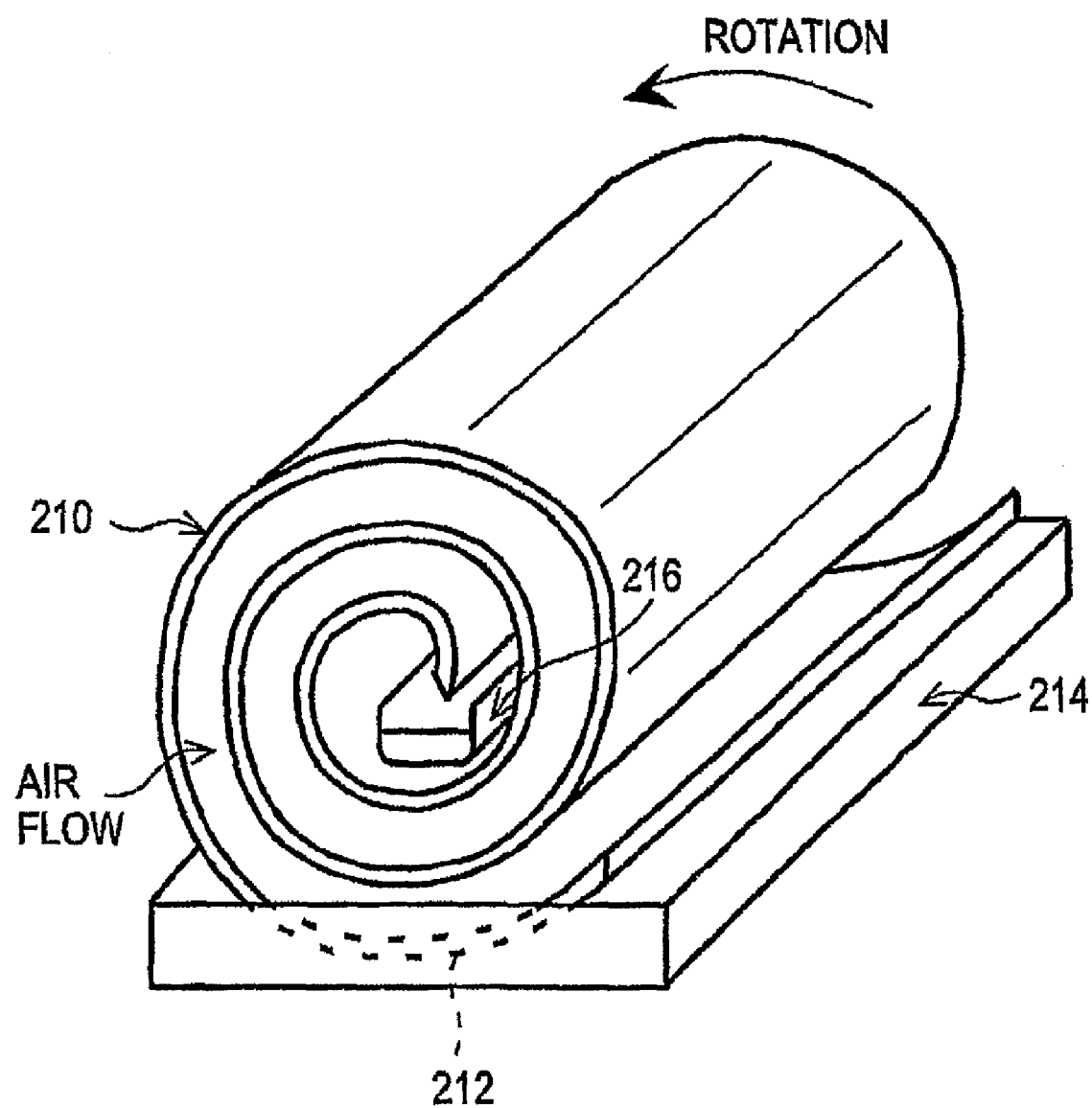

The simplest approach to wetting the foam would be the application of liquid on the top and letting it drain by gravity. Particularly large celled foams, or reticulated foams which drain easily are suitable for this approach. If wetting a foam is accomplished through flowing fluids and gravity based drainage, then slowly rotating the foam aids in obtaining even fluid coverage inside the foam. The direction of the axis of rotation must have a component in the horizontal direction, so that rotation does change the flow direction inside the foam as it changes the alignment of the foam with the direction of gravity. Rotation speeds are matched to the foam and fluid flow properties such that the bulk of the fluid but not all in the time of a rotation can flow to the bottom of the foam volume. By shaping the foam appropriately it is even possible to transfer fluid in the process of rotating the foam piece. As an example, the foam may be formed into a closed spiral shape 200 as depicted in FIG. 1(a), and slowly rotated about its axis with its rim or periphery 202 dipping into a pan or sump 204 containing liquid sorbent fluid 206. Channels 208 may be formed through the foam to allow passage of air. Alternatively, the foam may be formed into an open spiral shape 210 as depicted in FIG. 1(b) and slowly rotated with its periphery into a pan or sump 214 containing liquid sorbent fluid. Also, if desired, the central axis end of the foam spiral may be mounted in a sorbent collection tray 216 which rotates with the foam spiral.

The rotation in this case will gradually move the fluid from the rim of the shape to its center where it may be extracted from the foam.

Figure 2A:
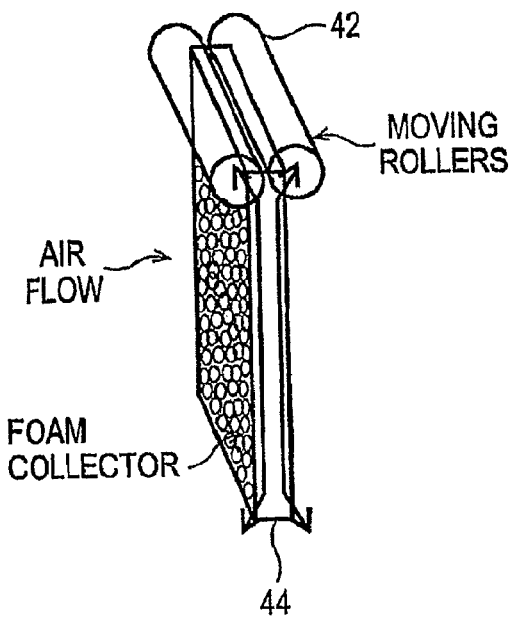
Figure 2B:
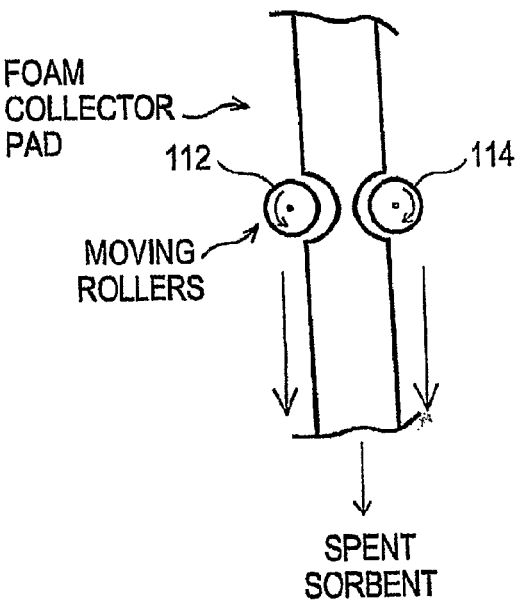
Figure 2C:
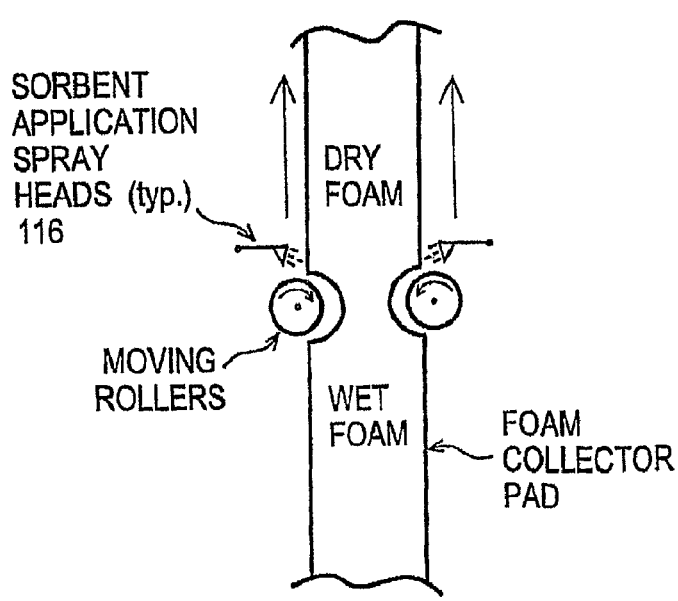

In foams that can be elastically compressed, it is possible to assure fluid mixing by moving the fluid by compressing and relaxing the foam. Referring to FIGS. 2(a)-2(c), in order to move liquid through the foam structure external pressure may be applied by moving rollers 42 over the surface of the foam 44 or by compressing foam blocks between flat plates. Rollers 42 may be smooth cylindrical surfaces that roll on both sides of the foam. The rollers push the external foam surfaces toward each other and thus force fluid to flow and mix throughout the volume. Alternatively, one can use a single roller on one side, and a rigid surface on the back of the foam holding the foam in place. This arrangement would be particularly useful for relatively thin foams, where the additional cost of a second roller and the concomitant structural complications would not be justified.

Instead of having smooth surfaces the surfaces of the rollers can be structured and shaped so as to increase the fluid movement in the foam by varying the degree of compression locally. Options include, simple fluting with ridges that follow the roller axis. Alternatively one can consider ridges that run circumferential around the rollers, or surfaces with dimples and protrusions. With any of these structured surfaces, it would be useful to match the surfaces on the opposing rollers (or shapes in the structured walls) so as to optimize fluid flow patterns. Attention must be paid to maximizing volume change in the foam while minimizing shear strain in the foam.

Referring to FIGS. 2(a)-2(c) particular implementation which we discuss here for illustrative purposes would be a foam matrix 44 rectangular in shape, with large width and height and a relatively small thickness, as an example consider a foam block collector pad, 2 meters high, 1 meter wide, and 0.3 m in thickness. Narrow tubular channels cross through the block in the 0.3 m thickness of the block. Air would flow through the foam in the direction of the channels, traversing the foam in the direction of its smallest dimension. Liquid could be applied to its two sides or to the top, and rollers 112, 114 would span the rectangular faces 2 m tall and 1 meter wide. The rolling action would squeeze liquid in place, a downward stroke with a high degree of compression could be used to squeeze liquid downward and let it drain from the bottom of the block.

Rollers 112, 114 would move up and down the sides of the foam, and they might move in or out to modify the compression on the foam collector pad. An upward stroke with less compression could be used to establish a uniform fluid filling throughout the brick.

Liquid 116 could be applied on the top of the brick and pushed down by the rollers. Some fluid will be pushed downward, and depending on the gap between the rollers a certain amount of fluid is left behind in the foam matrix. If the height of the foam is not too large all fluid could be applied on the top and pushed down to the bottom. Alternatively, we can spray the fluid onto the sides of the foam in advance of the rollers. If the compression is set high the rollers can be used to squeeze out liquid hat is either captured directly in front of the rollers as it pushes out of the sides of the rollers or if the speed of the rollers is sufficiently slow, the fluid will be pushed to the bottom of the foam pad, where it will be extruded and collected. It is thus possible to remove liquid from the pad by either injection additional carrier fluid, or just squeezing out liquid from the foam. In a second application fresh fluid is applied to the foam, which with a lower level of compression is evenly applied over the volume of the foam pad.

It also is possible to move the pads through the rollers and install the rollers in a fixed position.

Figure 3A:
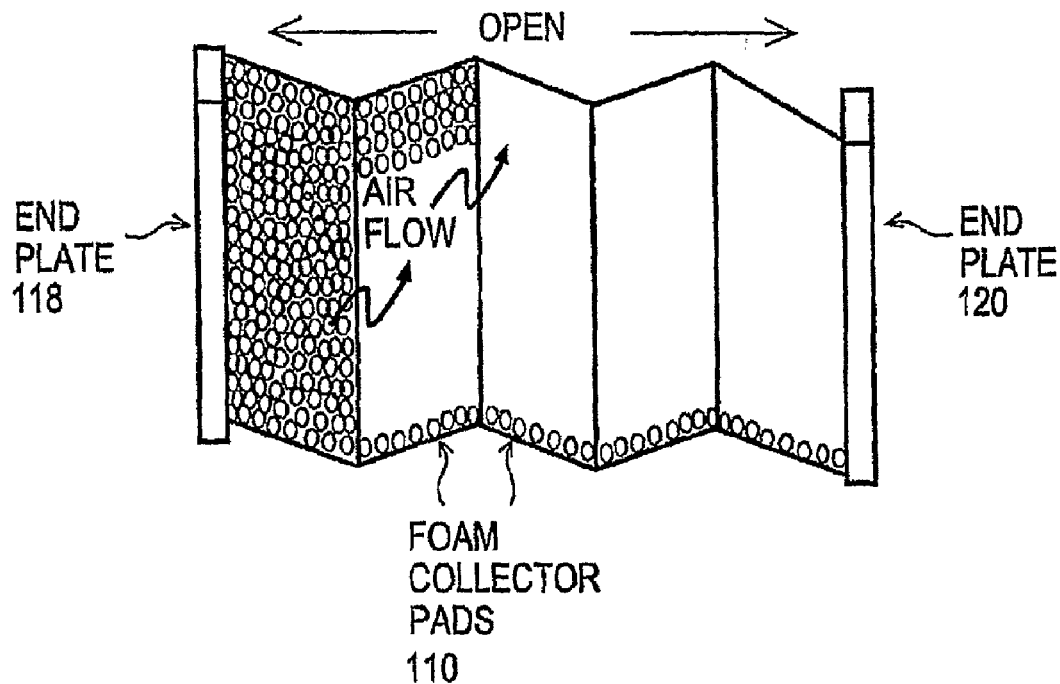
Figure 3B:
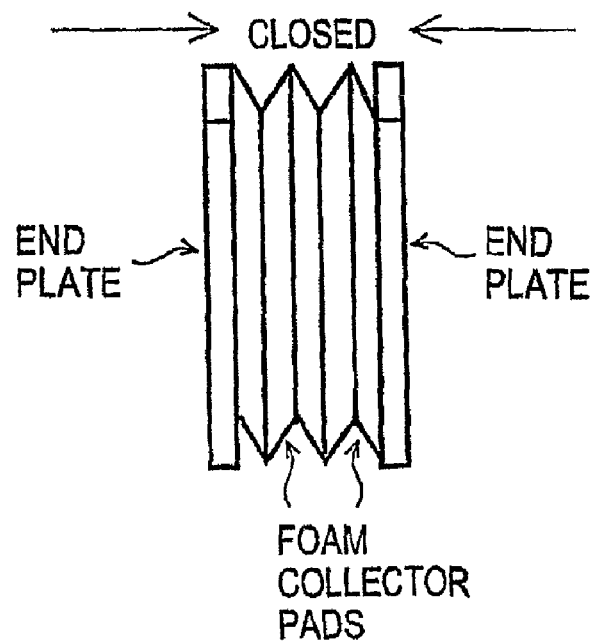

Referring to FIGS. 3(a)-3(b), an alternative to rollers would be flat plates 118-120 squeezing the entire area of the foam collector pads 110. This would work particularly well for arrangements in which the airflow is aligned in the vertical direction and the compression of the foam is used to squeeze fluid in and out of the foam parallel to the air flow direction, which usually represents the smallest dimension of the foam pad. It is also possible to turn the foam pad prior to squeezing and move it from an upright position into a horizontal position.

A particular implementation where the foam is moving rather than the rollers would be design where the foam moves as a continuous loop, like a belt over rollers that saturate and squeeze the foam, while the foam moves in an endless loop. These loops could be arranged in various ways, in particular it is possible to run the loop vertically up and down, or run it horizontally.

Figure 4A:
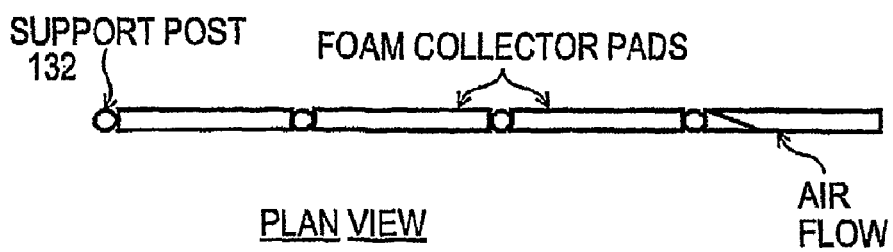
Figure 4B:
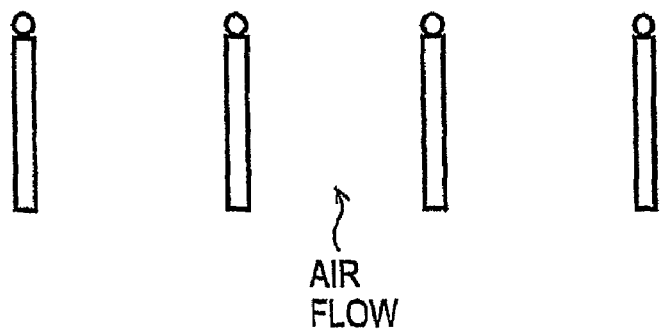
Figure 4C:
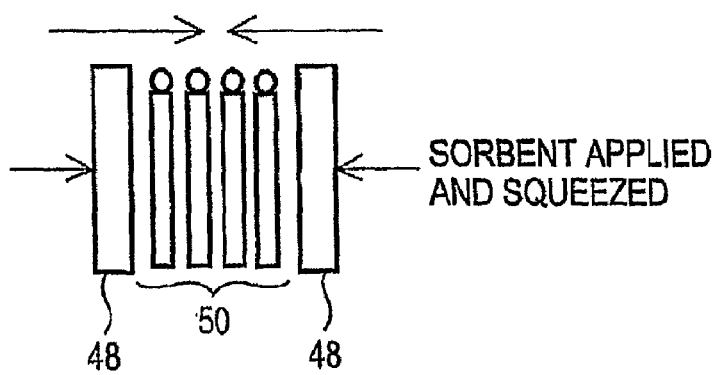

In yet another aspect of the invention, illustrated in FIGS. 4(a)-4(c), the collector may comprises a plurality of foam collector pad 50, each rotatably suspended from a support post 132 which support posts 132 are in turn horizontally movable between an operating and open position as shown in FIGS. 4(a)-4(b), respectively, and a closed position showed in FIG. 4(c) in which a liquid sorbent may be applied from a spray and excess sorbent squeezed via end plates 48. The amount of liquid present is chosen such that gas flow through the foam sees little impediment, the bulk of the pore volume is filled with gas, and gas filled pore spaces are interconnected so as to make it possible to transfer $CO_2$ by diffusion or other means from one pore to the next, until it gets absorbed.

For air side limited flows, channels are ideally straight, but the effective rate of migration of sorbate gas into the foam structure may be enhanced by creating pressure fluctuations in the flow field.

While sodium hydroxide solution may be employed as the sorbent in the above described apparatus, i.e. in accordance with the teachings of our aforesaid published PCT Application Ser. No. PCT/US06/03646, in accordance with one embodiment of our invention we may employ a wetted foam air extractor system that uses a sodium or potassium carbonate solution—or any other weak $CO_2$ sorbent, to absorb carbon dioxide from the air and in the process forms sodium or potassium bicarbonate; a sorbent recovery step that refreshes the carbonate sorbent by percolating the bicarbonate brine over a solid sorbent, which in a preferred implementation is an ion exchange resin; a resin recovery step using a liquid sorbent, which in a preferred implementation is a liquid amine solution, and a $CO_2$ release which is accomplished either by thermal swing, pressure swing or electrodialysis.

Following $CO_2$ from the air through the apparatus, can thus be described as follows: the air comes in contact with a weak sorbent, like sodium carbonate, that by virtue of its distribution over a foam surface can achieve uptake rates that are so high that air side transport starts limiting the $CO_2$ uptake. Once the solution has taken up sufficient amounts of $CO_2$, it percolates over a solid sorbent, for example an amine based ion exchange resin that removes bicarbonate from the solution and thus restores its alkalinity. The $CO_2$ is now attached to the resin and is removed from the resin in a subsequent step, by washing the resin with a another liquid sorbent, preferably an amine solution from which one can then in a final step recover the $CO_2$. Here the options are a thermal swing, a pressure swing, or an electrodialysis process.

Figure 5:
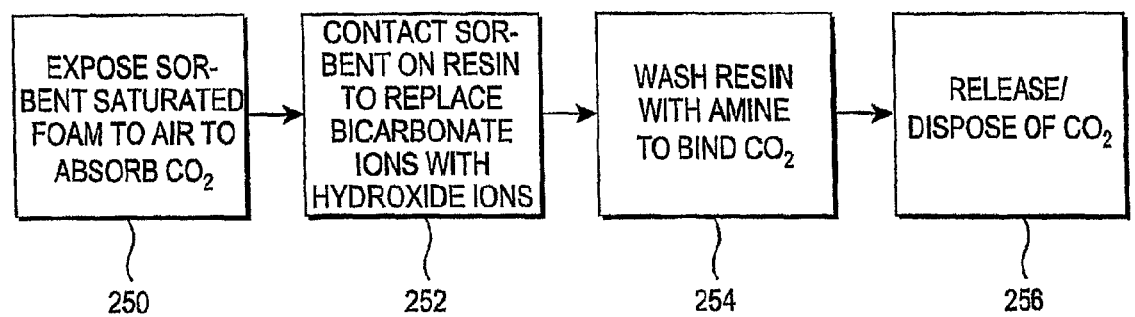

Referring to FIG. 5, the steps of the process are as follows: capture of carbon dioxide from air on a carbonate wetted foam at step 250. In this process, a wetted foam structure is exposed to ambient air which flows through the system at speeds ranging from 0.1 m/sec to 100 m/sec, the preferable range being from 0.5 m/sec to 10 m/sec and an optimal range of from 0.5 to 4 m/sec. These foam structures are shaped or arranged such as described above so that they have passageways through which air flows and comes in contact with the wetted foam surfaces. The wetted foam surfaces absorb carbon dioxide. In such case the $CO_2$ laden sorbent contains bicarbonate ions. The following steps of the process will have to recover the carbonate from a very dilute bicarbonate stream that is mixed in with a possibly much larger concentration of $CO_3^=$.

The ratio of carbonate to bicarbonate depends on the total carbon concentration. In order to have sorbent liquid move into and out of the foam, liquid is flushed out of the foam by one of several methods described elsewhere. The preferred method would be a design where gravity drainage of the liquid by itself will remove the spent sorbent, or a water flush will mobilize the spent sorbent and collect it at the bottom of the device. For implementations in which the optimal capture design does not lend itself to gravity drainage, other methods that utilize motion or compression of the foam are possible such as described above.

In any case, the resulting solution contains a dilute stream of sodium bicarbonate. Given the low concentration, direct sorbent and $CO_2$ recovery from this brine is usually not the most advantageous approach. As an alternative we provide a three stage approach where the low concentration bicarbonate is first concentrated by bringing the solution in contact with an amine based ion exchange resin.

In the next step 252, ion exchange resins in contact with bicarbonate solutions will absorb bicarbonate ions from the brine, and replace them with hydroxide ions, which in turn are neutralized by reacting with a second bicarbonate ion resulting in the formation of carbonate ions and water. Resins could be of various types, but several suitable resins are available commercially. Preferred are resins functionalized with amine groups. The important consideration is the binding energy of the bicarbonate (or carbonate) to the resin. It must be large enough to transfer $CO_2$ from the liquid to the resin, but weak enough to relinquish the carbon dioxide in the subsequent processing step. Typical binding energy would range from 20 to 60 kJ/mole but wider ranges are possible. While for practicality, organic resins are preferred, other solid sorbents equally could be utilized to perform this transition. One particularly preferred material is magnesium hydroxide, although other solid materials that can be carbonated may be used, such as lithium silicates and lithium zirconates which are given as examples. Such materials are capable of absorbing $CO_2$ and may be used as solid sorbents in accordance with the present invention. Similarly, various commercially available ion exchange resins are capable of recovering the carbonate brine, by raising the alkalinity back to that of the starting material may be used in the practice of the present invention.

A particular implementation is a resin bed through which $CO_2$ laden sorbent is cycled. As the sorbent flows through the bed the resin is gradually saturated with carbon dioxide. If flows are kept relatively slow, the absorption front will move gradually through the resin until it breaks out at the far end of the bed, at which stage one would observe a sudden increase in the concentration of bicarbonate in the effluent and thus know when the resin has been spent. Once this point has been reached, the resin is due to be refreshed.

The partial pressure of carbon dioxide in the air is very low, around 380 micro bar. As a result for most resins, this front will be rather wide and ill defined, in that case it would be advantageous to break the resin bed into multiple beds, and use a nearly spent bed, to begin the removal of carbon dioxide and thereby maximize saturation of the bed, use a one or more cascading beds to remove the bulk of the $CO_2$ from the sorbent and percolate the sorbent fluid finally through a last fresh bed, to maximize extraction. By plumbing and valving stationary beds together, it is possible to cycle their logical position in the chain of sorbent refreshing or in the resin recovery step. As a result, the steps of the operation move gradually through a ring of tanks. For some resins, the binding energy of different sites varies, and in that case it would be disadvantageous to push the resin to its limits. Instead in such a case the resin would swing back and forth within a range of binding energies that are easily accessible.

The resin is recovered in a step 254 by washing it with a different $CO_2$ sorbent, for example, an amine solution that binds carbon dioxide strongly enough to recover it from the resin. This will lead to a transfer of the bicarbonate, carbamate or carbonate ion from the resin to the amine solution. The advantage of this last step is that he amine solution can achieve far higher load factors, i.e., ratio of amine solution-to-$CO_2$ weight than the resin itself. The improvement is even larger, when compared to the initial carbonate brine. Thus less energy is wasted in heating and cooling the sorbent, than if the heat recovery step would be performed on the resin itself or if recovery were attempted from the original weak sorbent.

The amine solution loaded with $CO_2$ is transformed in a thermal swing to release carbon dioxide from the amine in a step 256. There are several options available for this step, since amine solutions are used in other carbon dioxide absorption systems. In one option, steam is used in transferring heat to the process. Preferably, heat for forming the steam will be from carbon neutral energy sources such as solar energy, or absent these sources, from the combustion of carbon based fuels with pure oxygen, thereby creating an additional stream of concentrated $CO_2$ that reflects the energy demand of the $CO_2$ recycling process. Of course, other heat sources including geothermal heat sources, solar energy heat sources, as well as waste heat energy sources may be used.

The invention is susceptible to modification. For example, instead of using inactive foam with a liquid sorbent percolating through it, it is possible to use a functionalized foam or resin without the use of a carbonate sorbent. In such case, the wetted foam would be used to directly collect carbon dioxide from the air. In such case, the foam should not be allowed to dry completely, but for some foams it may not be necessary to inject liquid water, since a minimum amount of moisture in the air may be sufficient to have the amine react with carbon dioxide form the air. Once the foam is saturated with $CO_2$, a flush with a secondary $CO_2$ sorbent may be used to regenerate the resin. This could be a carbonate solution, but with a higher concentration of sodium carbonate than in the system discussed above. The resin wash could also be an amine wash, in which case the process becomes a streamlined version of the main process discussed above.

Alternatively, instead of using carbonate sorbents in the foam one could use amine solutions directly in the foam. That would eliminate the second and third step of the process. The result is a process that is streamlined down to a single process step for capture followed by a single process step for sorbent recovery and $CO_2$ release.

It also is possible to replace the thermal swing for $CO_2$ recovery with an electrodialysis process. Electrodialysis could follow several distinct approaches, as disclosed, for example in our published PCT Application PCT/US06/03646. Electrodialysis could be applied to the bicarbonate solution generated in the first step, or alternatively, it could be applied to the amine solution that is generated in the final step.

In yet another aspect of the invention, we utilize solid phase anion exchange materials (AEM) for the direct capture of $CO_2$ and other acid gases from air. The application of AEMs as discussed herein with regards to its utility for low (ppm) absorption of $CO_2$ from air, but readily is usable for capturing other low concentration gases such as NOx absorption, and $SO_4$, as well as concentrated $CO_2$ or other gas removal.

Two alternatives are possible.

One alternative is to use an intermediate solid substrate that is able to be exposed to large volumes of air and collect $CO_2$ at low concentrations while acting as a solid with little or no vapor pressure. The solid substrate can be envisioned to act as a sort of net, storing the $CO_2$ chemically until it is released into solution at a later time. Further the solid substrate is able to release the newly collected $CO_2$ back into a solution that also regenerates the solid surface. The solution containing the captured $CO_2$ is regenerated in an energetically feasible way. A volatile or high vapor pressure solution can be utilized to collect the $CO_2$ from the substrate and can be regenerated at low energy penalty. This intermediate step allows us to cleave $CO_2$ attached to a substrate without exposing the substrate to the open environment, preventing atmospheric contamination and loss.

The above process exchanges anions to and from a solid substrate. Here we are utilizing the anion exchange partner fastened to a solid substrate participating in ion transfer. An example of this is the reaction of methylamine onto a styrene backbone via chloro-methylation (a common ion exchange resin used in deionized water systems). In this type of systems a nitrogen group such as an amine is attached to a polymer back bone via a covalent bond. This covalent bond pins the ammonia type molecule to the substrate while allowing it to dissociate (to form a cation and anion). If all four of the possible covalent bonds that can be attached to the nitrogen are filled with carbon groups, the nitrogen is forced into an electron deficient state and acquires a permanent positive charge. The permanent charge on the ammonium ion turns it into a cation which must then be satisfied by the ionic attachment of a neighboring anion. This is a salt that is covalently attached to a solid polymer substrate.

The ability to create a solid surface that acts like a strong base solution provides several features and advantages not limited to the following:

1. The $CO_2$ net utilizes the anion exchange properties of the amine salt while capitalizing on the zero vapor pressure of the solid polymer backbone. Essentially the amine salt can be forced into a hydroxide form ($OH^-$) by replacing all of its anions via concentration gradient leaving a surface of $OH^-$ attached to the solid. The attached $OH^-$s are now readily available for reacting with incoming $CO_2$. Since most of the techniques to capture $CO_2$ exploit the reaction of the acid gas with a liquid base, or $OH^-$ surface, this method shares in the fast acid/base reaction kinetics.
2. The elimination of a liquid film intermediate allows for large increases in surface area as compared to current methods. In gas liquid contactors the challenge is to spread the liquid in such a way as to contact as much air as possible. This normally involves spreading the liquid over a solid surface to increase its surface while not inducing such a large pressure drop that the gas is not able to properly flow. The solid $OH^-$ surface allows for maximum surface area with minimal pressure drop.
3. Minimal water is required for the reaction to occur and overall, essentially no water is consumed. The membrane is able to cleave water from the air in order to facilitate the capture. When large volumes of air are concerned this is a major benefit.
4. Because the $OH^-$ is attached to the polymer substrate, it is no longer able to react with the environment unless there is an anion available to replace it or an acid is available to react with it. This is a benign surface that is highly reactive with acid gases only. This allows the complete removal of a strong oxidizer from direct contact with the environment while still facilitating capture.
5. Another problem with contacting large volumes of open air is airborne contamination of the collector itself. The buildup of dirt and bacteria within the system is inevitable. As long as there is no anion transfer to the solid itself from the contaminants, the surface can be washed with water before being treated or regenerated, eliminating contaminates from entering the rest of the separation process.
6. Little or no liquid pumping is required between surface renewals. This significantly reduces pumping costs from distributing the fluid over a surface to create contact area.
7. Since the process for attaching anion exchange groups to polymers is relatively well understood, there is no limit to the types or shapes of materials to which the anion exchange material could be applied.

In one aspect our invention employs solid anionic exchange membranes as the primary capture matrix for the capture and subsequent delivery of atmospheric $CO_2$. The membranes are spaced closely together with spacings from 1-25 mm. This spacing allows for the passage of ambient air with a pressure drop sufficiently low to preclude the use of machines to move the air. This is in accordance with the matrix construction discussed our aforesaid PCT Application Ser. No. PCT/US05/29979.

The advantages of using ion exchange membranes as the material for the matrix are several. One advantage lies in the fact that the membranes can be operated in such a way as to be nearly dry, thus removing the risk of spreading caustic materials through the environment in the form of aerosols. Another advantage in operating in an essentially dry mode is the absence of water loss due to evaporation. This water loss is significant not only in the amounts of water lost to evaporation, but also in all the attendant costs of pumping, purchasing and plumbing of the water delivery systems. Another advantage is the membrane's ability to store the captured $CO_2$ at a concentration greater than that possible with an aqueous surface of the same area. The increased apparent active area exceeds the equivalent aqueous area. This allows capture at rates that exceed those possible by using aqueous solutions. Additionally, the total capture capacity is in excess of that possible with aqueous solutions.

Figure 6:
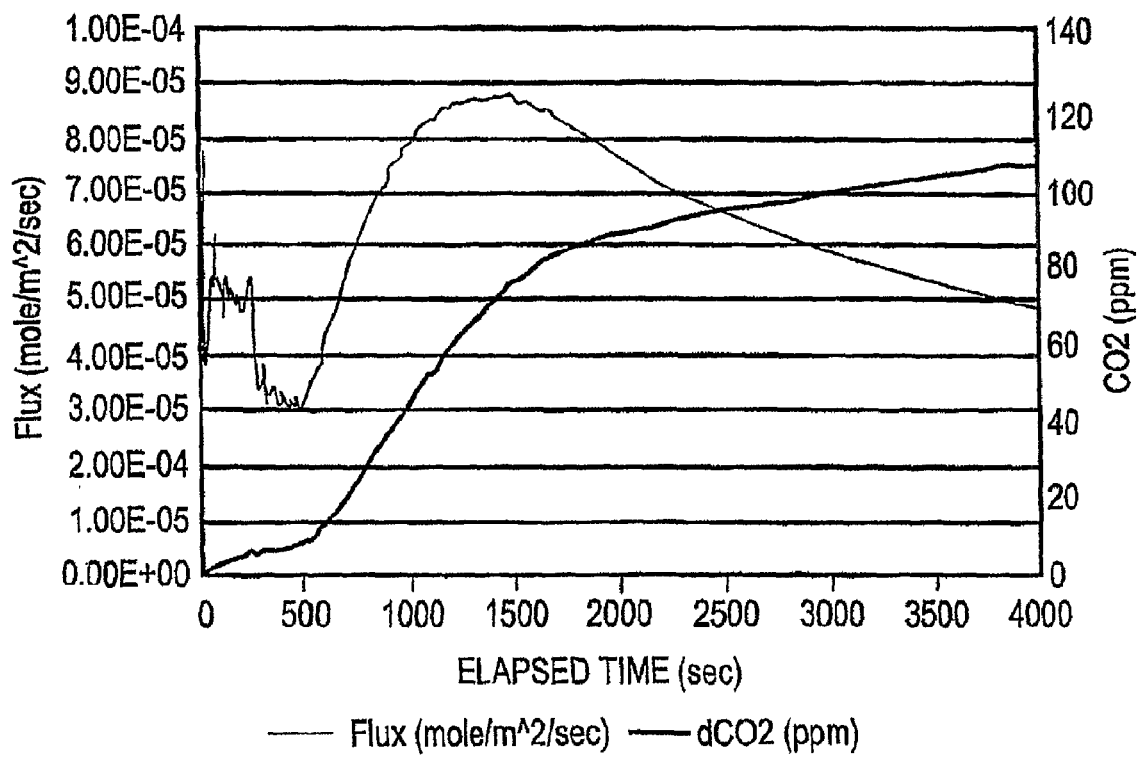
Figure 7:
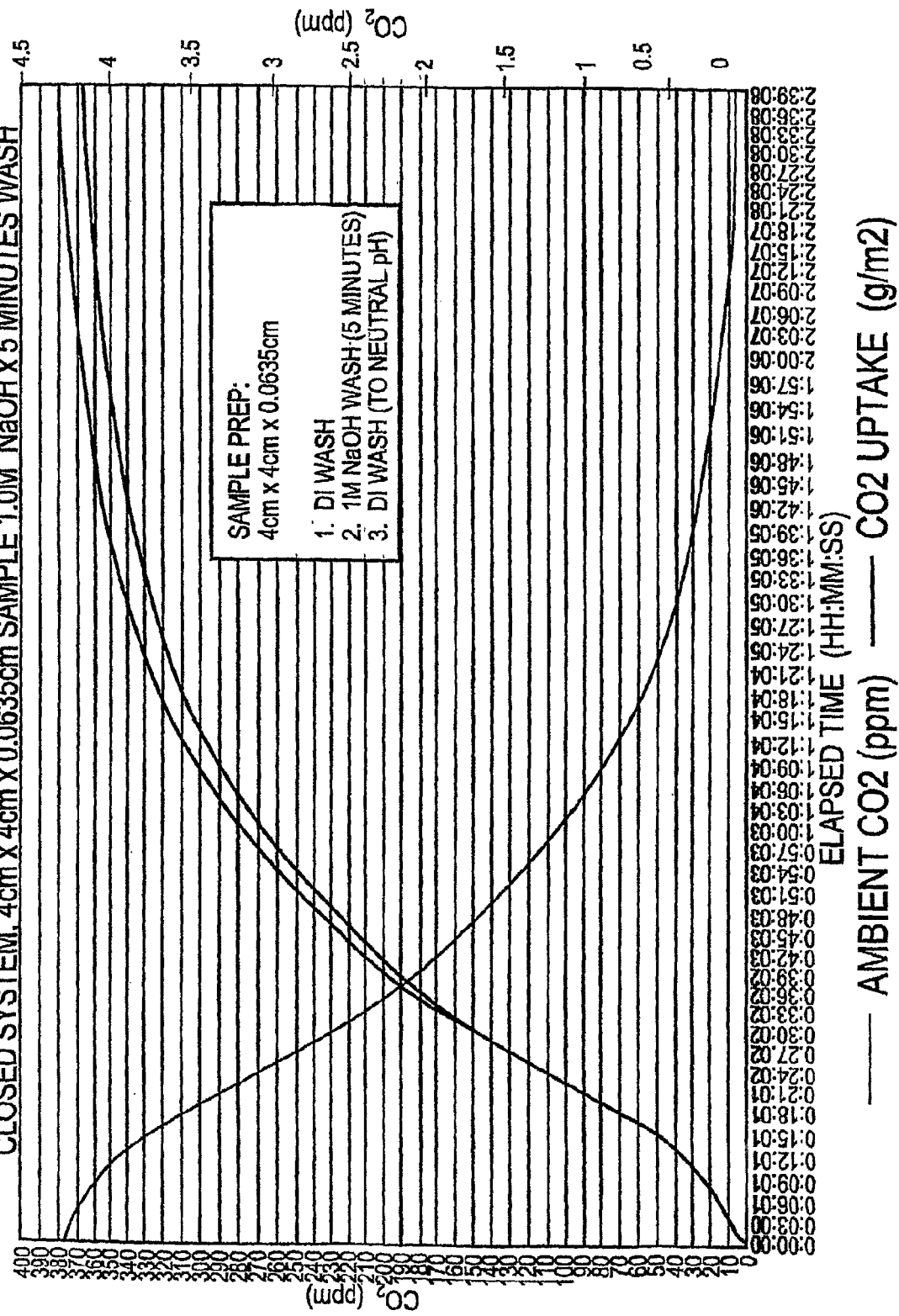
Figure 8:
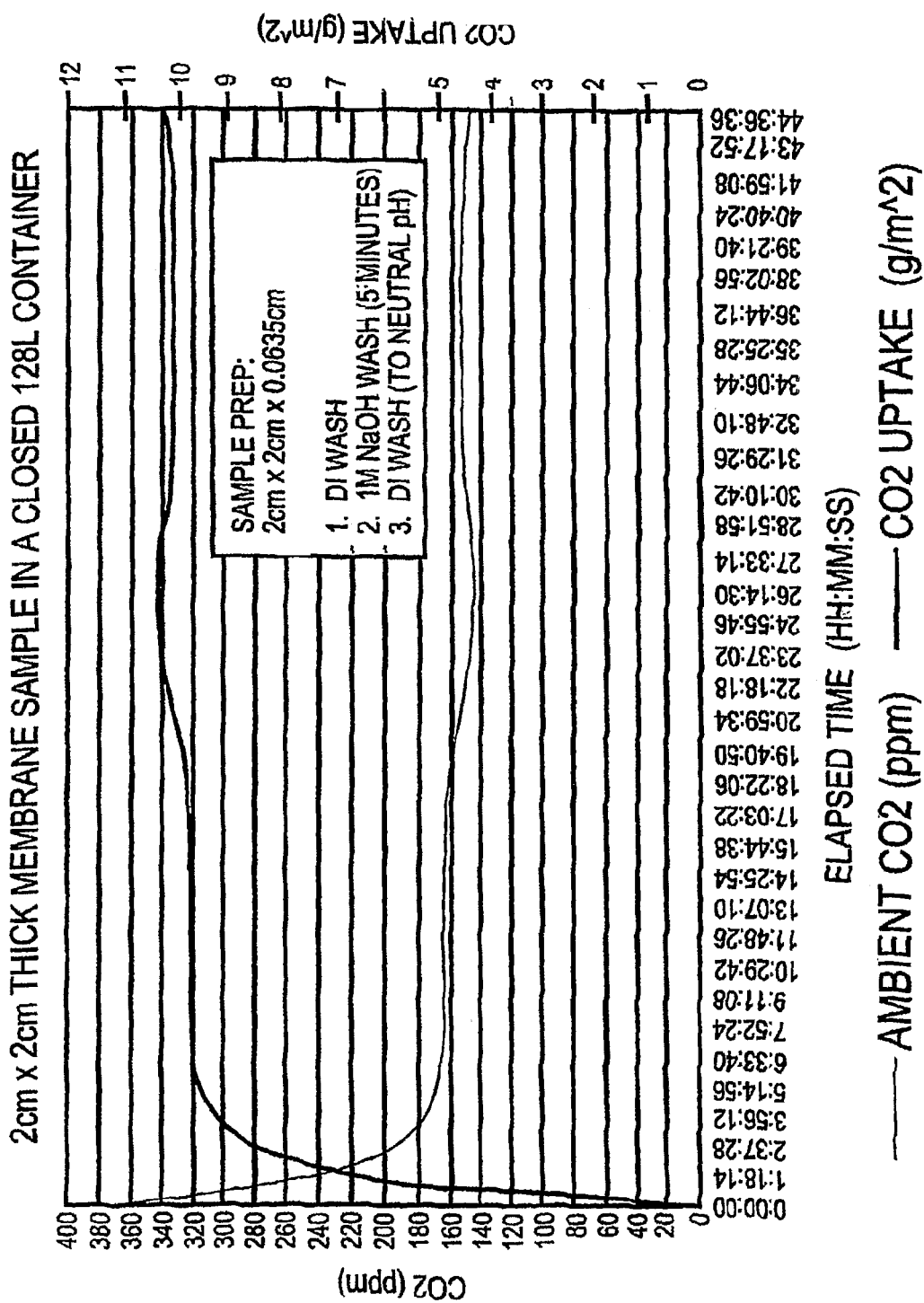

The attached FIGS. 6-8 which illustrate the $CO_2$ capture performance of an anionic membrane exposed to both a continuous ambient air flow and also a closed container (18.9 L) within which a small piece (2×2 cm) of active membrane is suspended and the drawdown of the $CO_2$ in the enclosed bottle is measured and logged.

Another data set shows a small piece of active membrane suspended within a larger (128 L) closed container with same data measured and logged.

In yet another aspect, the present invention employs cellulose based pads as substrates for ion exchange media (IEM). As noted supra, IEM works by allowing ions to exchange from a solution with like charged ion within the IEM. This exchange can be accomplished via several routes.

In one process a high concentration fluid induces like charged ions on the IEM to migrate away from the resins' ion receptive sites into the solution and allow the higher concentration ions in the solution to occupy the sites. This can be envisioned as overpowering the resin via a concentration gradient.

The absorption of $CO_2$ on an IEM takes place via the following mechanism:

$$CO_2 + H_2O \rightarrow H_2CO_3$$

$$H_2CO_3 \rightarrow H^+ + HCO_3^-$$

$$Resin(OH^-) + H^+ + HCO_3^- \rightarrow Resin(HCO_3^-)$$

Cellulose based IEM's have become very efficient. Using the EDM method of animolysis to functionalize cellulose into an IEM has shown almost equivalent storage attributes as the commercially available IEM that are based on styrene divinylbenzene. This provides the pathway for cellulose utilization.

We have found that IEM's have the ability to capture $CO_2$ directly from the air and release it via concentration gradient into an amine wash solution. This has many implications Due to the large regeneration energy requirements of carbonated earth alkaline solutions, the use of amine based alkaline solutions has shown a significant energy advantage. The problem, however, is that most amine solutions that exhibit the desirable qualities required, such as high kinetic rate and absorption capacity, also exhibit a high partial pressure. Due to the large amounts of air that must be contacted to facilitate the absorption, (around 2 million cubic meters per ton of $CO_2$ assuming 200 ppm uptake), even low vapor pressure solutions have a very high loss rate. Without an intermediate between the liquid amine and the air most amine solutions would not be applicable to the direct capture of $CO_2$ from the air.

The IEM is just that intermediate, which allows us to minimize the contact time of the absorbent solution with large volumes of air but still take advantage of the low regeneration costs of the liquid amine solution.

Since the surface of the contactor is produced from the sorbent itself, there is no need to constantly wet a surface with sorbent liquid to facilitate absorption. This is possible because the IEM's retain significant amounts of water (some as high as 50% by mass). This coupled with an internal concentration gradient allows the IEM to act as a solution. As $CO_2$ is absorbed onto the IEM a concentration gradient is induced that causes the migration of $HCO_3^-$ away from the surface to a lower concentration and the counter migration of $OH^-$ to replace it. This effectively allows the IEM to store $HCO_3^-$ deep within its structure while not losing effective surface area. Of course, once the IEM becomes saturated after a set amount of time, the amine wash solution could be used to regenerate the media to its $OH^-$ state and lose very little amine in the process. Our experiments have shown absorption periods of greater than 8 hours.

By eliminating the use of a continuous free passing ionic liquid solvent we also eliminate the formation of crystals on the collector surface which ultimately will lead not only to decreases in the collector performance but also in the lifetime of the substrate. The IEM will circumvent this issue molecularly by storing the ionic products within the substrate itself. Instead of the salt residing on the surface of the substrate where it can form scale and cause fouling, the anions that are produced in the $CO_2$ absorption process have no counter ions which will enable them to sit independently on the surface of the media When the $CO_2$ is absorbed to the surface of the media, it effectively neutralizes the $OH^-$ anion portion of the resin replacing it with an $HCO_3^-$ effectively storing it in the substrate.

Figure 9:
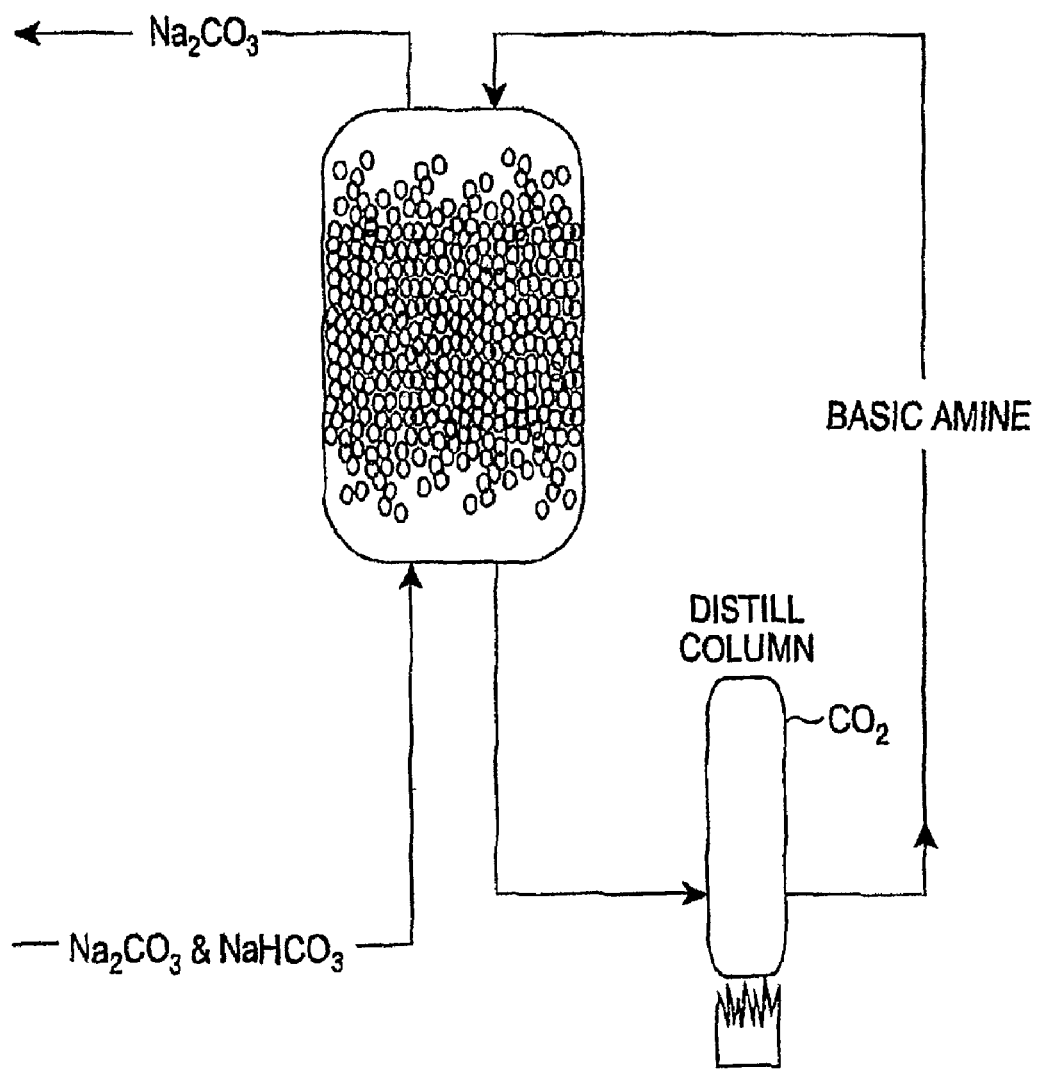
FIG. 9 is a process flow diagram in accordance with an embodiment of the invention.

Yet another embodiment of the invention is a process for regenerating an ion exchange resin used in capturing $CO_2$. FIG. 9 exhibits the general process flow diagram.

To achieve separation and recovery of $Na_2CO_3$, $CO_2$ is removed from the $NaHCO_3$ in passing the liquid through an ion exchange media, in which $CO_2$ is released, which undergoes an acid/base reaction with the $NaHCO_3$ remaining in the liquid, thus regenerating $Na_2CO_3$. The $Na_2CO_3$ solution then exits the ion exchange column and is returned to the upstream process.

The ion exchange media will over time become saturated with $CO_2$ and must be regenerated. This is achieved by passing a liquid amine solution through the bed after the $Na_2CO_3$ + $NaHCO_3$ stream has been removed. The liquid amine solution will release an $OH^-$ to the ion exchange resin, which in turn releases the $CO_2$, effectively regenerating the ion exchange media. The amine-$CO_2$ solution is then removed and the process is repeated as a cyclic system.

The amine-$CO_2$ solution must also go through a recovery step in order to complete the cycle. The amine-$CO_2$ recovery is accomplished in a distillation in which the $CO_2$ is separated and captured in the gas phase and the amine-$OH$ solution is returned to the bed.

The following non-limiting example further illustrates this aspect of the invention. A strong base macro-reticulated ion exchange resin was used to cleave $HCO_3-$ from $NaHCO_3$ into the ion exchange resin by releasing $OH^-$ ions into solution, therein creating $Na_2CO_3$. The solution that had passed through the resin was then titrated to measure the quantity of $Na_2CO_3$ produced from the ion exchange. The resin was then thoroughly washed until there was no $Na_2CO_3$ or $Na_2CO_3$ left in the resin. The washed resin was then divided into two equal parts by volume and each part was contacted with a liquid amine solution, one was contacted with a primary, the other with a tertiary amine. The primary amine (MEA) and the tertiary amine (MDEA) were each used to remove the $CO_2$ that was stored in the resin. The MEA solution showed a greater ability to cleave the carbonate from the resin, while the MDEA solution exhibited, similar, but slightly lower absorption ability. Each amine-$CO_2$ solution was then titrated to verify the presence of the $CO_2$ within the solution.

Figure 10:
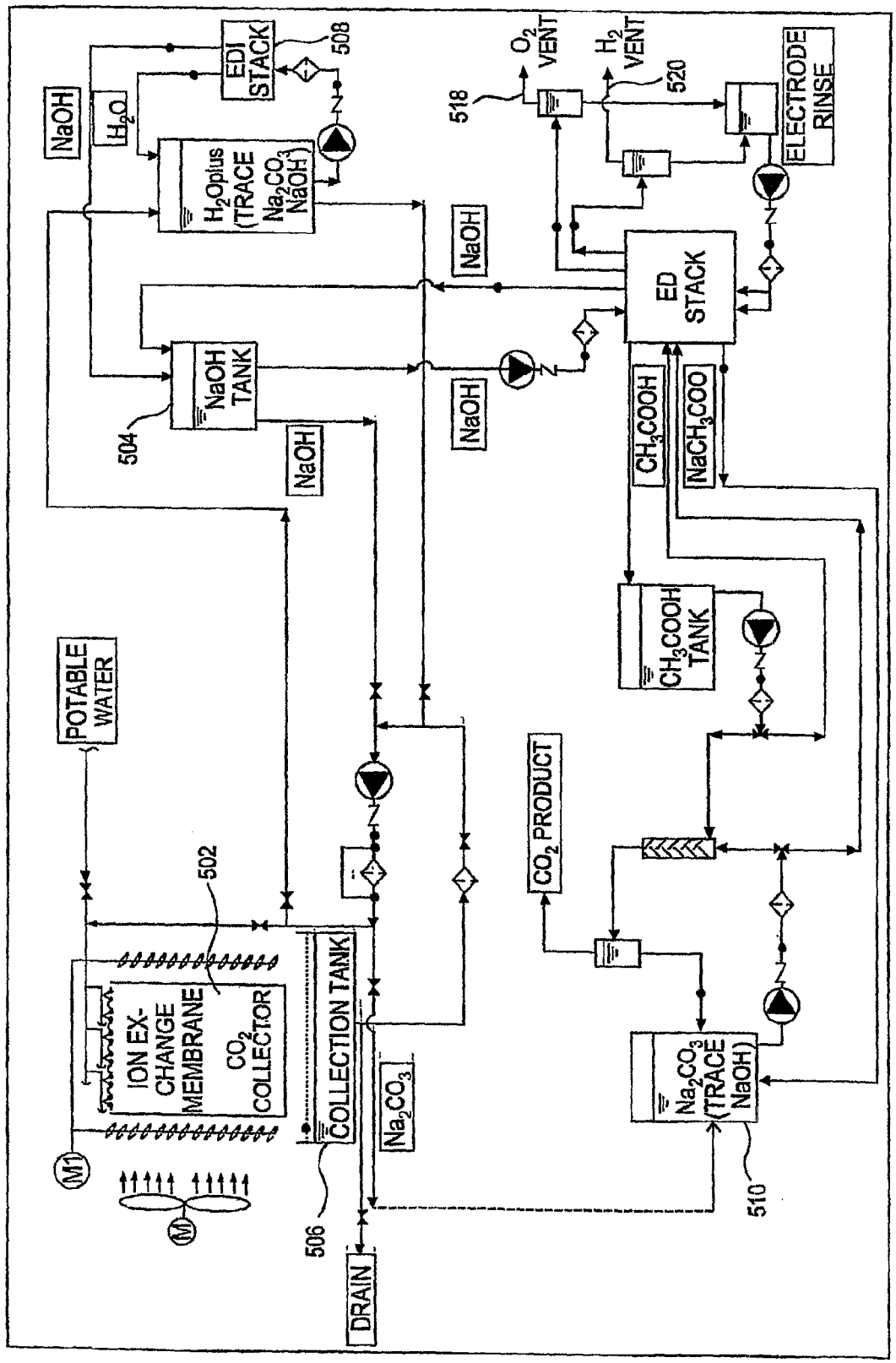
FIG. 10 is a schematic flow diagram showing an integrated system for $CO_2$ removal from air in accordance with another aspect of the invention.

Yet another aspect of the invention is illustrated in FIG. 10 which provides an integrated system for $CO_2$ removal from ambient air on an ion exchange member (IEM) 502. The $CO_2$ removal from the air by an IEM is washed from the IEM by sodium hydroxide delivered from a sodium hydroxide supply tank 504, producing sodium carbonate ($Na_2CO_3$) solution which is collected in collection tank 506. The sodium carbonate solution is electrolyzed in an electrolytic cell 508 wherein sodium hydroxide is recovered and returned to tank 504. A portion of the sodium carbonate solution is also passed to the tank 510 in which the sodium carbonate is passed to a reactor 512 wherein the sodium carbonate is reacted with acetic acid to produce sodium acetate which is passed to a electrodialysis stack 516 which regenerates sodium hydroxide and acetic acid from the sodium acetate salt feed. The acetic acid is returned to tank 514 where it is used for subsequent mixing/reaction with the sodium carbonate from tank 510, while the sodium hydroxide is returned to tank 504. Oxygen and hydrogen are collected or vented at outlets 518, 520, while $CO_2$ is collected and disposed of, e.g. by deep well injection or other means at outlet 522.

Yet another aspect of the invention employs seawater, i.e. the ocean, as a collector for $CO_2$. The mixed layer of the ocean, roughly the top hundred meters, are in chemical delayed equilibrium with the atmosphere and carbon dioxide in the air readily exchanges with dissolved inorganic carbon in this layer. The dissolved inorganic carbon is in equilibrium with the partial pressure of $CO_2$ in the air. Carbon dioxide will enter the water either if the carbon dioxide partial pressure in the air increases or, alternatively, if the alkalinity of the ocean water is increased. The concept of introducing alkalinity into seawater as a mechanism for capturing $CO_2$ from air is described in PCT/US2005/015453. The present invention provides improvements over this concept.

The alkalinity of seawater can be modified by either adding a base to the water or by removing an acid. In one case, alkalinity of seawater may be increased by extracting hydrochloric acid from the water. In another case, alkalinity may be increased by introducing a base that is obtained by splitting a salt, usually but not always sea salt, into an acid an a base. The base is added to seawater in a very dilute form, while the acid usually in a more concentrated form is retained for further processing and/or recovered for industrial use.

In order to reestablish equilibrium with the atmosphere, the water will absorb carbon dioxide from the air, until the $CO_2$ uptake has quantitatively matched the change in alkalinity.

Ocean water will absorb approximately one mole of carbon dioxide from the air for every mole of one-normal acid formed. A slight mismatch is due to the fact that inorganic dissolved carbon is not completely bicarbonate, but a small fraction that is present as carbonate ions. Thus the effective normality of carbonic acid in seawater is slightly higher than its molarity. Reestablishment of the carbonate equilibrium will occur on a short time scale of less than one year and thus will happen without human intervention, except in places where surface waters are rapidly sinking. Thus, nearly the entire ocean surface is suitable for this form of $CO_2$ management. An advantage of this aspect of the invention is that it obviates the need for air exchange apparatus to remove carbon dioxide from air. The actual act of carbon dioxide capture is performed spontaneously and without the need for a sorbent or physical collector installations.

As a result of this process, one is left with an acid other than carbonic acid, typically hydrochloric acid which is much stronger than carbonic acid, and therefore can more readily be neutralized by mineral based alkalinity. Thus, rather than trying to dispose of a weak acid like carbonic acid which is difficult to bind with mineral base, we generate a much stronger acid which is more readily neutralized by readily available minerals that have a low level of reactivity. Alternatively, the hydrochloric acid may be collected for industrial use.

The capture of carbon dioxide from the atmosphere by removing hydrochloric acid from ocean water could occur along the coast, or in the middle of the ocean on board a ship. The important thing is that the acid extraction is performed on seawater that is in the mixed surface layer and which therefore will be exposed to carbon dioxide in the air within weeks or months after it has been processed. Rather than bringing carbon dioxide to the disposal one removes hydrochloric acid from the ocean water. An important advantage of this approach is that it requires only minute modifications in alkalinity of a local area of the ocean, whereas addition of carbon dioxide without changes in the alkalinity greatly changes the carbonate chemistry of seawater. Furthermore, the $CO_2$ captured by excess alkalinity is stable and will not be released back into the air.

For such a sequestration method to become viable, it is necessary to dispose of the large volumes of hydrochloric acid that will be produced in this process. One possibility is to dispose of the hydrochloric acid by neutralizing it with readily available alkaline minerals such as basalt or serpentine rock. As an alternative, the hydrochloric acid can be injected underground into alkaline fluid reservoirs that can neutralize the acid. Yet another possibility is to use mined and ground up minerals that can be transformed with the acid. These processes all are known in the art and have been published in the literature. Here they are combined with a specific process for capturing carbon dioxide from the air to develop a method of carbon dioxide management that is distinct from other approaches to the problem.

In the case where magnesium and calcium chlorides are formed, if the minerals are clean, they may be reinjected into the ocean where they readily dissolve. Alternatively, the resulting brines could be injected underground.

In yet another aspect of this invention, an electro-dialysis device is used to extract hydrochloric acid from seawater. The result is to create concentrated hydrochloric acid which may be collected and used industrially, while barely changing the water chemistry of the ocean water that is passed through the system. This is accomplished by flowing a large volume of seawater through the cells that collect the base, while running a small material flow through the cells that turn more acidic.

The input on the basic side is seawater, which is converted to seawater with a very small change in alkalinity. Ideally the change is so small that the local water chemistry is not much affected by the change. Since the total alkalinity in seawater is about 2 millimolar, changes could be kept much smaller than that. In practice, it may be useful, to have slightly larger changes and force dilution in the seawater stream at the exit of the system. On the other hand, in order to avoid fouling changes should still be kept as small as possible. Fouling could easily occur when solubility products in the mixture are changed by significant factors.

Figure 11:
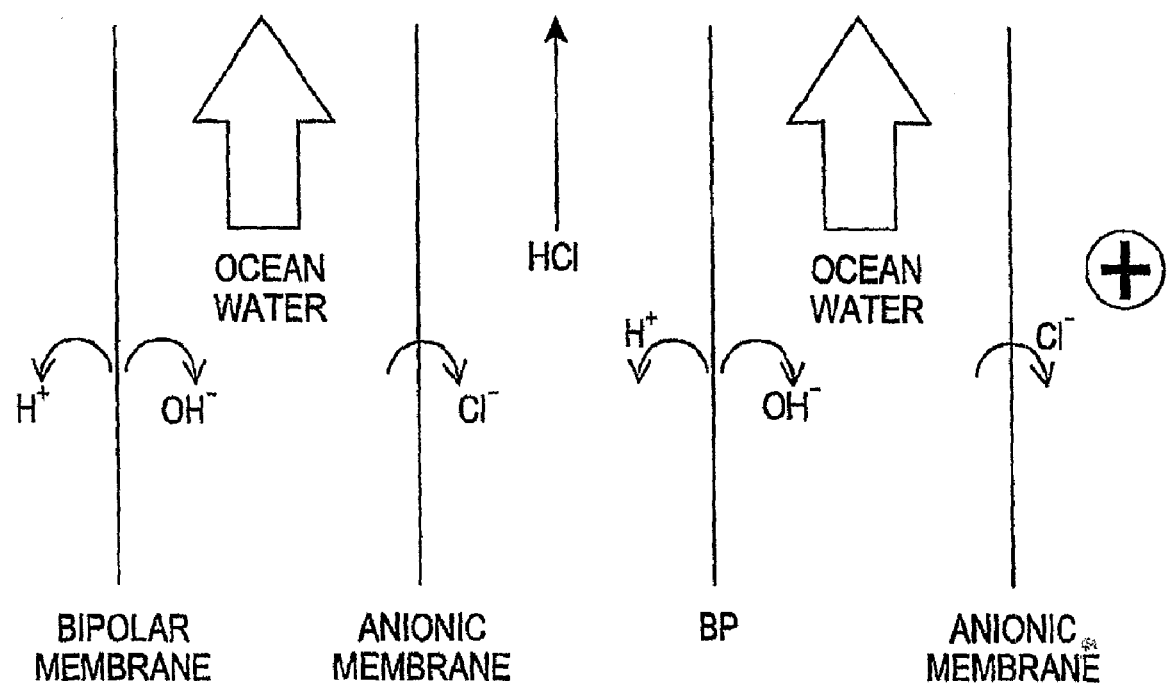
FIGS. 11-14 are schematic diagrams of cells for treating seawater in accordance with alternative aspects of the invention.

The input to the acidic side may be seawater or it could also be pure water, or any other brine that is available. Specifically, it is possible to have multiple stages in the creation of hydrochloric acid and thus the input of that least some of the cells could be a hydrochloric acid solution that upon its exit has been strengthened in its molarity. FIG. 11 shows an example of such a device. This design is based on a particular approach that eliminates the use of cationic membranes which are usually present in an electrodialysis stack.

There are two substantively different approaches. The first has a number of cells separated with anionic and bipolar membranes. The anionic and bipolar membranes alternate, with the stack completed on one end with an anode and at the other end with a cathode. Seawater in the larger cells will receive hydroxide ions from the bipolar membrane and lose chloride ions through the anionic membrane. The acid forms in the complementary compartments which receives protons from the bipolar membrane and chloride ions through the anionic membrane. Since the flow here is low the acid concentration will rise significantly, whereas the change in the seawater chemistry is kept small.

FIG. 11 is a sketch of a repeated section of an electrodialysis device for extracting hydrochloric acid from ocean water. The ocean compartments experience high flow in order to minimize the chemical change in the water. In contrast the flow rate in the acidic cell is very slow, so as to maximize the concentration of the resulting flow acid. It is possible to use the output of one HCl cell as inflow into the next one. As a result the pH step is not everywhere maximized.

Flow rates on the alkaline and acidic side of the cells may differ by orders of magnitude. On the other hand, it is possible to achieve the same effect by reusing the acidic fluid multiple times before it is a send out as a product stream. In either design, the output streams are slightly modified ocean water and concentrated hydrochloric acid. With one mole of hydrochloric acid removed from the ocean water, the water will absorb from the atmosphere an amount of carbon dioxide that represents one mole of $CO_2$. Since carbonic acid in seawater disassociates mainly into bicarbonate ions and protons, with a small contribution from carbonate ions, it requires approximately 1 mole of $CO_2$ to compensate for the amount of hydrochloric acid withdrawn.

It is possible to build an electrodialytic device without cationic membranes because the concentration of chloride ions in the ocean water will always far exceed the concentration of hydroxide ions, as the pH is barely changed in the process. As a result the bipolar membrane separates two fluids where on both sides the dominant negative ion is a chloride ion. The complementary device which is build exclusively with cationic membranes alternating with bipolar membranes would not work well. In this case HCl would be formed by transferring sodium ions out of the HCl cell through the cationic membrane. Once HCl has started to form protons would compete with sodium in the transfer and thus create a large inefficiency.

It also is possible to design a conventional electrodialysis device with three different membranes alternating in the design. In that case a salt is split into its anion and cation. The cation is added to an ocean water flow, the anion ends up in the acid compartment. If the reduction in alkalinity in the acid compartment starts with highly alkaline brine, that is never neutralized, then it is possible to eliminate the anionic membrane. In that case one in effect combines neutralization of the acid and production of the acid into a single step.

Figure 12:
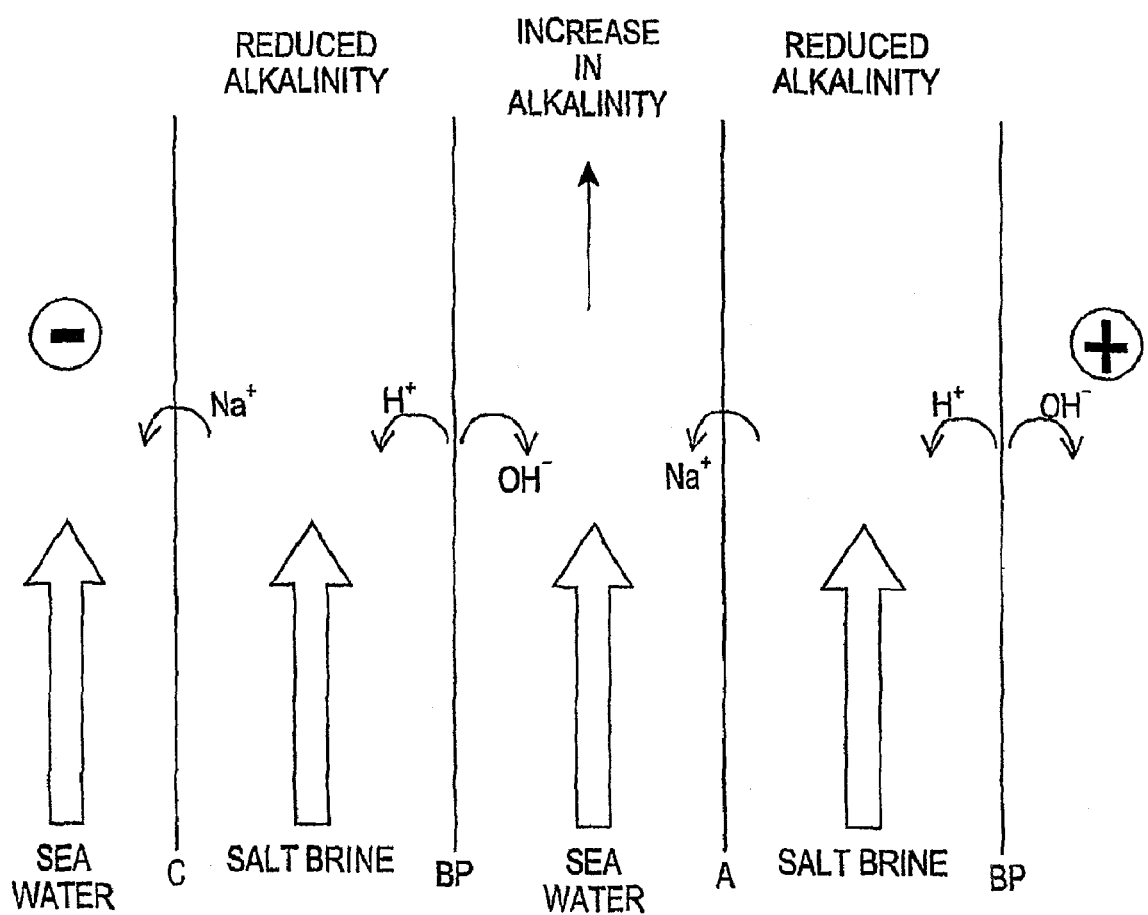

FIG. 12 is a sketch of an electrodialytic device that alternates cationic, anionic and bipolar membranes. The cells are arranged to raise the alkalinity of seawater on one side of the bipolar membrane and create HCl on the other side of the bipolar membrane. The cell between the cationic and anionic membrane contains a salt solution, in this case seawater, which is diluted in its concentration.

A design shown in FIG. 12 allows the separation of seawater into a slightly diluted seawater stream, a slightly more alkaline stream and into a stream of separated acid. A preferred implementation might use the slightly diluted stream of seawater obtained from salt splitting and make it the input stream for the seawater that will leave with increased alkalinity. It is also possible to use a different salt in the cell from which anions and cations are removed. A particular example would be the use of a sodium salt of a weak acid; in that case the acid produced in the last chamber would not be HCl but a different acid that again would be ready for disposal. See FIG. 13.

Figure 13:
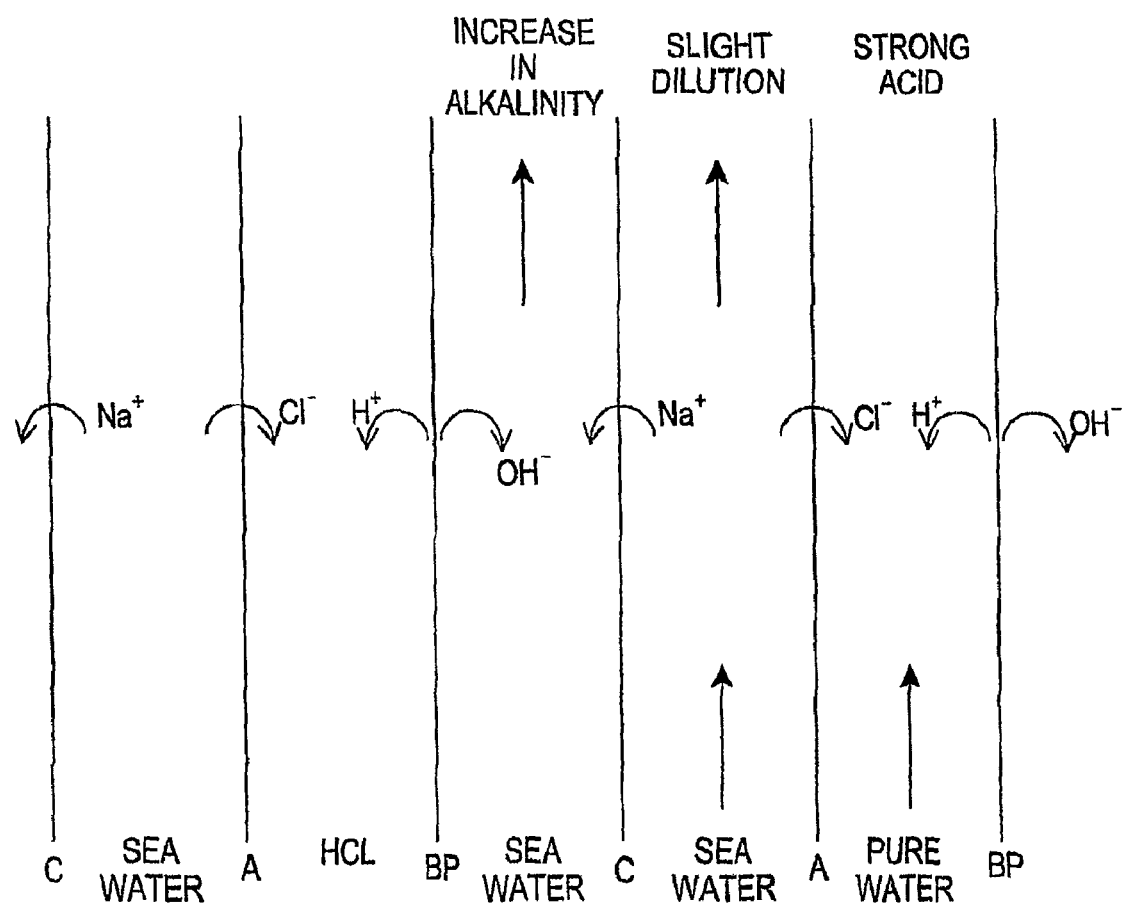

FIG. 13 illustrates an electrodialysis cell stack that utilizes a different salt with anion X, to raise the alkalinity of seawater while creating a separate acid HX ready for disposal. For illustrative purposes we assume that the salt is NaX, however, any cation that could be safely injected into ocean water could be used in the salt brine.

Figure 14:
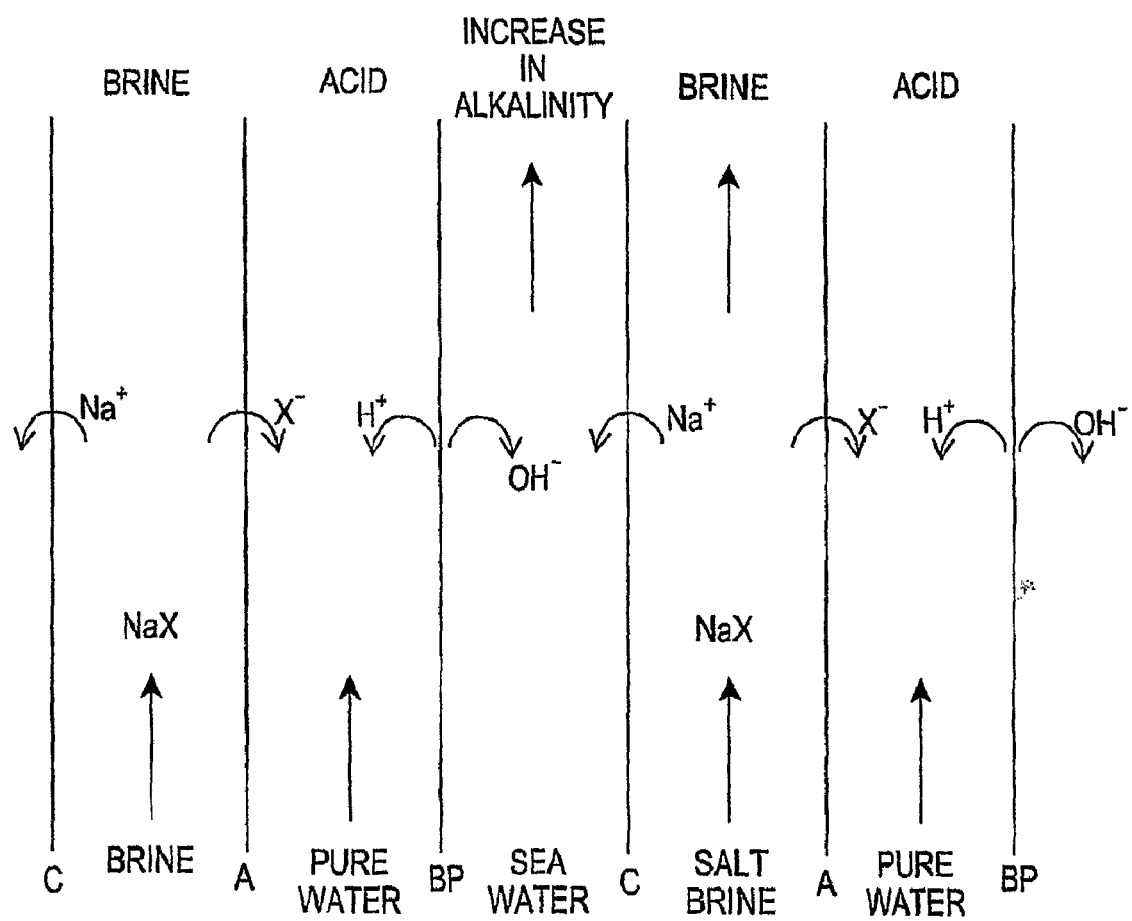

FIG. 14 illustrates a salt splitting cell without anionic membranes that immediately injects the produced acid into geological subsurface brine. The embodiment laid out in FIG. 14, combines electrodialysis with the disposal of the hydrochloric acid, while avoiding the need for anionic membranes. If the geological brine is more alkaline than seawater, it is possible, with appropriate membranes to have the system run without input of electricity, as it acts as a battery driven by the pH difference between the ocean water and the brine. Thermodynamics spontaneously will move toward reducing the pH difference between the two fluids. Since no cell operates at high acidity, it is possible to eliminate the anionic membrane which is used in the standard salt splitter.

Various changes made be made in the above without departing from the spirit and scope of the invention as described. By way of example, the air capture exchange membrane may be in the form of elongate threads, typically 0.1-10 mm wide, preferably 1-10 mm wide, forming a loose mat through which the air is flowed. The air capture exchange membrane also may be in the form of tubes, honeycomb structure or a foam structure. It is intended that all subject matter contained in the above description, as shown in the accompanying drawings or defined in the following claims to be interpreted as illustrative, and not in a limiting sense.

We claim:

1. An apparatus for the capture of $CO_2$ from ambient air, the apparatus comprising a store of ambient air, an anion exchange material in contact with a flow of said ambient air, and a collector that collects $CO_2$ separated from said anion exchange material subsequent to the capture of said $CO_2$ by said anion exchange material.

2. The apparatus of claim 1, characterized by one or more of the following features:
   a. wherein the anion exchange material is in the form of a plurality of membranes arranged in a series of flat plates with the ambient air flow parallel to face surfaces of the membranes;
   b. wherein the anion exchange material is in the form of a plurality of membranes spaced from one another with membrane spacings of from 1-25 mm, exposed to ambient air flow;
   c. wherein the anion exchange material is in the form of a plurality of membranes spaced from one another, and further comprising a powered blower for moving air across surfaces of the membranes;
   d. wherein the anion exchange material is in the form of one or more membranes arranged in a corrugated fashion to allow air flow through channels formed by the corrugations;
   e. wherein a flow path along the anion exchange material has a length dictated by air flow velocity such that the ambient air is not excessively depleted of $CO_2$;
   f. wherein the anion exchange material is in the form of a plurality of membranes stacked in layers and forming "pie shaped" sections assembled into a wheel, rotating on an axle;
   g. further including a caustic solution wash for washing captured $CO_2$ from a surface of the anion exchange material, wherein the wash preferably comprises an amine or a carbonate solution;
   h. wherein the anion exchange material is in the form of a continuous sheet which is moved in a serpentine pattern such that the membrane first is exposed to air flow, dipped in a caustic, amine, or carbonate solution, and then exposed to the ambient air repeatedly; and
   i. wherein the anion exchange material is in the form of a loose mat of threads or tubes, or a honeycomb structure or a foams structure.

3. A method for the capture of $CO_2$ from ambient air, the method comprising: exposing an anion exchange material to a flow of ambient air; capturing $CO_2$ from the ambient air with said anion exchange material; separating said $CO_2$ from said anion exchange material; and subsequently collecting said separated $CO_2$.

4. The method of claim 3, characterized by one or more of the following features:
   a. wherein the anion exchange material is in the form of a plurality of membranes arranged in a series of flat plates, and the air is flowed substantially parallel to surfaces of the membranes;
   b. wherein the anion exchange material is in the form of a plurality of membranes spaced from one another with membrane spacings of from 1-25 mm, and air is flowed past the membranes without auxiliary boost;

c. wherein the anion exchange material is in the form of a plurality of membranes spaced from one another, and a blower is used to power air flow across surfaces of the membranes;

d. wherein the anion exchange material is in the form of a plurality of membranes having membrane surfaces, and further wherein air flow and said membrane surfaces are matched so that the air is not excessively depleted of $CO_2$;

e. wherein the anion exchange material is in the form of a plurality of membranes stacked in layers and forming "pie shaped" sections that are assembled into a wheel, and including the step of rotating the periphery of the wheel through a $CO_2$ sorbent;

f. including the step of washing the anion exchange material with a wash solution after exposure to the air so as to wash captured $CO_2$ from the surface of the anion exchange material, so that the anion exchange material can repeatedly act as a $CO_2$ absorber;

g. including the step of washing the anion exchange material with a wash solution which comprises an amine solution, or a carbonate or bicarbonate solution; and h. wherein the anion exchange material is in the form of a continuous sheet, and including the steps of moving the sheet in a serpentine pattern such that the sheet is first exposed to air flow, dipped in a wash solution, and then exposed to the air repeatedly.

5. A method for capturing $CO_2$ from ambient air, the method comprising: exposing an anion exchange material to a flow of ambient air; capturing $CO_2$ from the ambient air; releasing said captured $CO_2$ using a thermal swing, a pressure swing, or an electrodialysis process; and subsequently collecting said separated $CO_2$.

6. A method for the capture of $CO_2$ from ambient air, the method comprising: exposing an anion exchange material to a flow of ambient air;

capturing $CO_2$ from the ambient air with said anion exchange material; separating said $CO_2$ from said anion exchange material; and subsequently disposing of said $CO_2$ by deep well injection.

7. The method of claim 5, wherein said captured $CO_2$ is released using a thermal swing.

8. The method of claim 5, wherein said captured $CO_2$ is released using an electrodialysis process.

9. The method of claim 3, 5, or 6, further comprising storing said collected $CO_2$.

10. The method of claim 3, 5, or 6, whereby amount of $CO_2$ in said ambient air is reduced.

11. The method of claim 3, wherein said collecting is preceded by a recovery step comprising a thermal swing, a pressure swing, or an electrodialysis process.

12. The method of claim 3, 5, or 6, wherein said anion exchange material comprises an amine.

13. The method of claim 12, wherein said amine is covalently bound to four carbon groups.

14. The method of claim 3, 5, or 6, wherein said anion exchange material is regenerated in a process having a low energy penalty.

15. The method of claim 3, 5, or 6, wherein said anion exchange material comprises a plurality of membranes.

16. The method of claim 15, wherein said plurality of membranes are arranged in series.

17. The method of claim 15, wherein said plurality of membranes are spaced apart from one another with spacing from 1 mm to 25 mm.

18. The method of claim 3, 5, or 6, wherein said anion exchange material has a thickness from 0.1 to 10 mm.

19. The method of claim 15, wherein said plurality of membranes are stacked in layers forming pie shaped sections that are assembled into a wheel.

20. The method of claim 3, 5, or 6, wherein, said anion exchange material comprises tubes.

21. The method of claim 3, 5, or 6, wherein said anion exchange material comprises a foam structure.

22. The method of claim 3, 5, or 6, wherein said anion exchange material comprises a honeycomb structure.

23. The method of claim 22, wherein said anion exchange material comprising a honeycomb structure comprises spacing from 1 mm to 25 mm.

24. The method of claim 22, wherein said honeycomb structure has a thickness from 0.1 mm to 10 mm.

25. The method of claim 3 or 5, further comprising disposing of said separated $CO_2$ by deep well injection.

* * * * *